United States Patent
Morita et al.

(10) Patent No.: US 8,431,272 B2
(45) Date of Patent: Apr. 30, 2013

(54) ACTIVE MATERIAL, NONAQUEOUS ELECTROLYTE BATTERY, BATTERY PACK AND VEHICLE

(75) Inventors: Tomokazu Morita, Funabashi (JP); Norio Takami, Yokohama (JP); Hiroki Inagaki, Kawasaki (JP); Yasuhiro Harada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 981 days.

(21) Appl. No.: 12/048,519

(22) Filed: Mar. 14, 2008

(65) Prior Publication Data

US 2008/0236909 A1    Oct. 2, 2008

(30) Foreign Application Priority Data

Mar. 28, 2007  (JP) .................................. 2007-084284

(51) Int. Cl.
*H01M 4/38* (2006.01)
*H01M 4/52* (2010.01)
*H01M 4/50* (2010.01)

(52) U.S. Cl.
USPC .................. 429/231.95; 429/231.5; 429/221; 429/223; 429/234

(58) Field of Classification Search ............. 429/231.95, 429/231.5, 224, 221, 223
See application file for complete search history.

(56) References Cited

U.S. PATENT DOCUMENTS 6,482,546 B1    11/2002  Ohshita et al.
2007/0057228 A1*  3/2007  Huang et al. ............... 252/182.1

FOREIGN PATENT DOCUMENTS

| JP | 7-230800 | 8/1995 |
| JP | 2000-268822 | 9/2000 |
| JP | 2004-235144 | 8/2004 |

OTHER PUBLICATIONS

Chunhai Jiang, et al., "Short communication, Particle size dependence of the lithium storage capability and high rate performance of nanocrystalline anatase $TiO_2$ electrode", Elsevier, ScienceDirect, Journal of Power Sources 166, 2007, pp. 239-243.

* cited by examiner

*Primary Examiner* — Ula C Ruddock
*Assistant Examiner* — Frank Chernow
(74) *Attorney, Agent, or Firm* — Oblon, Spivak, McClelland, Maier & Neustadt, L.L.P.

(57) ABSTRACT

An active material including a metal oxide represented by the following formula (1):

$$Li_xM1_aM2_bTiO_z \qquad (1)$$

where M1 represents at least one element selected from the group consisting of Zr, Ge, Si and Al, M2 represents at least one element selected from the group consisting of Cr, Mn, Fe, Ni and Sn, Ti has an oxidation number of +4, and x, a, b and z satisfy the following requirements: $0.01 \leq x \leq 0.2$, $0.005 \leq a \leq 0.1$, $0.005 \leq b \leq 0.1$ and $2 \leq z \leq 2.5$.

16 Claims, 9 Drawing Sheets

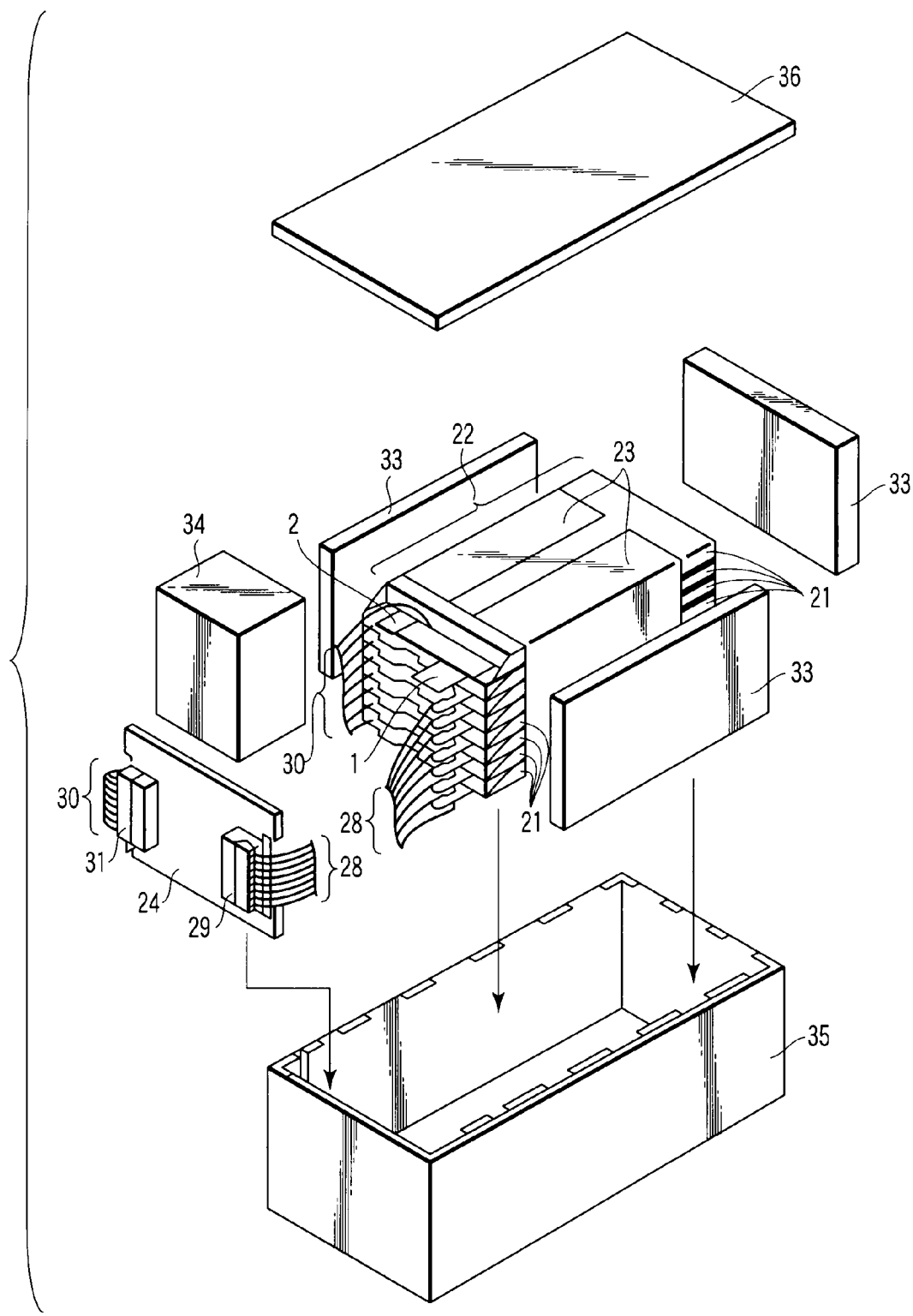
F I G. 7

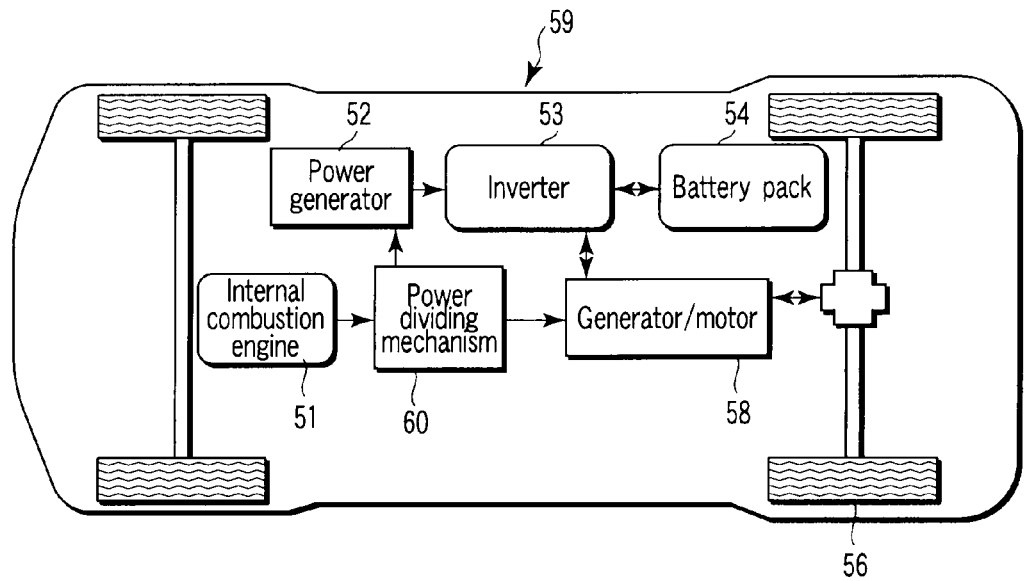
F I G. 11
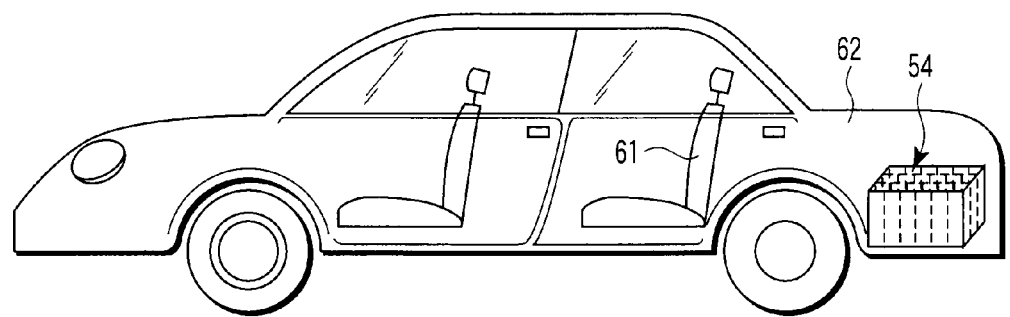
F I G. 12

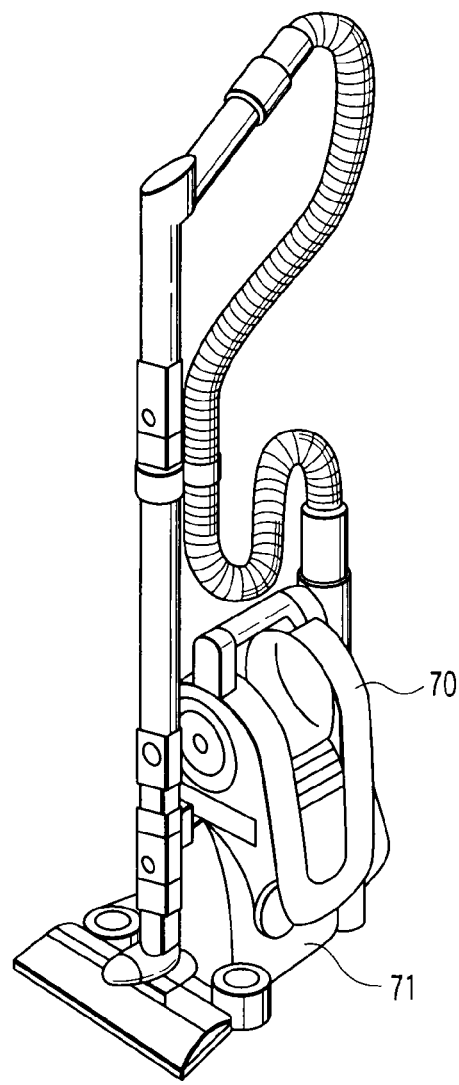
F I G. 15
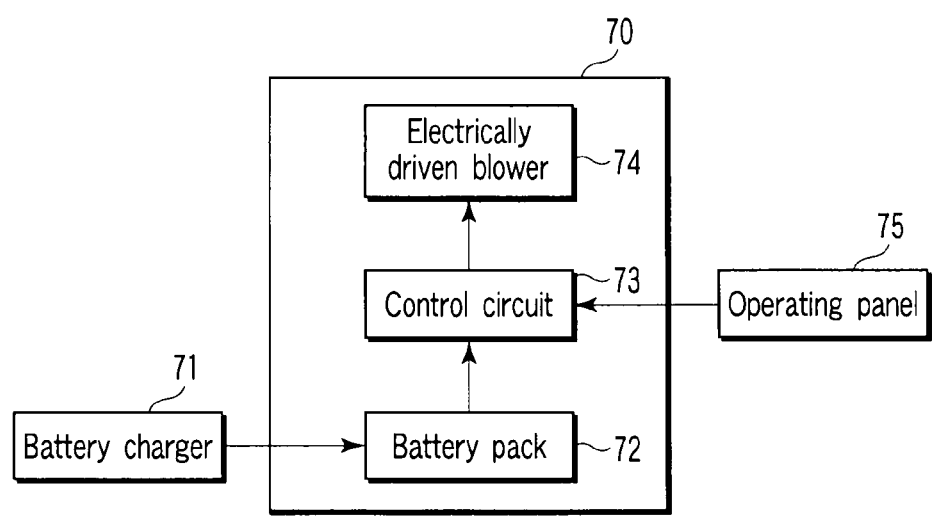
F I G. 16

ACTIVE MATERIAL, NONAQUEOUS ELECTROLYTE BATTERY, BATTERY PACK AND VEHICLE

CROSS-REFERENCE TO RELATED APPLICATIONS

This application is based upon and claims the benefit of priority from prior Japanese Patent Application No. 2007-084284, filed Mar. 28, 2007, the entire contents of which are incorporated herein by reference.

BACKGROUND OF THE INVENTION

1. Field of the Invention

The present invention relates to an active material, a non-aqueous electrolyte battery, a battery pack and a vehicle.

2. Description of the Related Art

As one of the trends in improvements in the performance of nonaqueous electrolyte batteries such as lithium secondary batteries, there is an improvement in reliability in, for example, long-term storage performance. To improve the reliability of such batteries, it is crucial to reduce the deterioration caused by a side reaction between a nonaqueous electrolyte and an electrode active material. As a method of significantly suppressing the side reaction, there is a method in which the charge potential of a negative electrode is raised. The potential of the negative electrode during charging is raised not by using an active material like graphite which charges and discharges at a potential close to the ionization potential of a lithium metal but by using, as a negative electrode, an active material which undergoes a lithium-absorption/release reaction at a higher potential. The side reaction in the nonaqueous electrolyte scarcely progresses by the use of such an active material. Negative electrode active materials used to achieve such ends are desired to enable the release and absorption of lithium at a potential range of 0.5 to 2 V (vs. Li/Li$^+$).

Although oxides such as Li$_4$Ti$_5$O$_{12}$ and TiO$_2$ enable the release and absorption of lithium at a potential range of 0.4 to 2.5 V (vs. Li/Li$^+$), they provide unsatisfactory capacity and cycle performance. Lithium titanate such as Li$_4$Ti$_5$O$_{12}$ has high reliability in the lithium-absorption/release reaction. However, the capacity per weight of lithium titanate is about ½ that of graphite at the most. Therefore, the energy density of a lithium secondary battery using lithium titanate is lower than that of a lithium secondary battery using the graphite. It is therefore necessary to use a new active material having a large capacity to make progress in higher energy densification of a battery. However, there is the problem that, for example, TiO$_2$ having a higher capacity density per unit weight than lithium titanate is increased in cycle deterioration. Three documents explained below disclose the technologies concerning these active materials, to limit cycle deterioration caused by addition of other metal elements. However, all of these batteries are deteriorated not only in cycle performance but also in capacity.

In JP-A 2004-235144 (KOKAI), a lithium-transition metal composite oxide having a spinel structure containing an alkali metal and/or alkali earth metal and specifically, a lithium-transition metal composite oxide represented by the formula: Li$_a$Ti$_b$M$_d$O$_{4+c}$ (M represents at least one element selected from the group consisting of a II-group, XIII-group or XIV-group metal in the periodic chart, a halogen atom, sulfur and transition metals except for titanium, $0.8 \leq a+d \leq 1.5$, $1.5 \leq b \leq 2.2$, $0 \leq d \leq 0.1$ and $-0.5 \leq c \leq 0.5$) is used as the negative electrode active material for a nonaqueous electrolyte battery.

JP-A 2000-268822 (KOKAI) discloses that a composite oxide is used as the active material of the positive electrode or negative electrode. The composite oxide contains a phase of an anatase type crystal structure, and is represented by the formula: M$_X$Ti$_{1-X}$O$_2$ (M represents at least one of V, Mn, Fe, Co, Ni, Mo and Ir, and $0 \leq X \leq 0.11$).

In the meantime, JP-A 7-230800 (KOKAI) discloses that a composite oxide represented by the formula: Li$_x$Si$_{1-y}$M$_y$O$_z$ ($0 \leq x$, $0 < y < 1$, $0 < z < 2$, M represents a metal excluding an alkali metal or a similar metal excluding silicon) is used as the negative electrode active material of a nonaqueous electrolyte secondary battery. JP-A 7-230800 (KOKAI) discloses a method in which a composite oxide is produced by treating a starting material to heating in an atmosphere excluding oxygen, such as an inert gas atmosphere or under vacuum. This method enables controlling the quantity of oxygen or the partial pressure of oxygen in the heat treatment atmosphere, thereby making it easy to yield the composite oxide.

BRIEF SUMMARY OF THE INVENTION

According to a first aspect of the present invention, there is provided an active material containing a metal oxide represented by the following formula (1):

$$Li_xM1_aM2_bTiO_z \qquad (1)$$

where M1 represents at least one element selected from the group consisting of Zr, Ge, Si and Al, M2 represents at least one element selected from the group consisting of Cr, Mn, Fe, Ni and Sn, Ti has an oxidation number of +4, and x, a, b and z satisfy the following requirements: $0.01 \leq x \leq 0.2$, $0.005 \leq a \leq 0.1$, $0.005 \leq b \leq 0.1$ and $2 \leq z \leq 2.5$.

According to a second aspect of the present invention, there is provided a nonaqueous electrolyte battery comprising:
a positive electrode;
a negative electrode containing a metal oxide represented by the following formula (1); and
a nonaqueous electrolyte, $$Li_xM1_aM2_bTiO_z \qquad (1)$$

where M1 represents at least one element selected from the group consisting of Zr, Ge, Si and Al, M2 represents at least one element selected from the group consisting of Cr, Mn, Fe, Ni and Sn, Ti has an oxidation number of +4, and x, a, b and z satisfy the following requirements: $0.01 \leq x \leq 0.2$, $0.005 \leq a \leq 0.1$, $0.005 \leq b \leq 0.1$ and $2 \leq z \leq 2.5$.

According to a third aspect of the present invention, there is provided a battery pack comprising a nonaqueous electrolyte battery, the nonaqueous electrolyte battery comprising:
a positive electrode;
a negative electrode containing a metal oxide represented by the following formula (1); and
a nonaqueous electrolyte, $$Li_xM1_aM2_bTiO_z \qquad (1)$$

where M1 represents at least one element selected from the group consisting of Zr, Ge, Si and Al, M2 represents at least one element selected from the group consisting of Cr, Mn, Fe, Ni and Sn, Ti has an oxidation number of +4, and x, a, b and z satisfy the following requirements: $0.01 \leq x \leq 0.2$, $0.005 \leq a \leq 0.1$, $0.005 \leq b \leq 0.1$ and $2 \leq z \leq 2.5$.

BRIEF DESCRIPTION OF THE SEVERAL VIEWS OF THE DRAWING

FIG. 7 is an exploded perspective view of a battery pack according to a third embodiment;

FIG. 11 is a typical view showing a series-parallel hybrid vehicle according to the fourth embodiment;

FIG. 12 is a typical view showing a vehicle according to the fourth embodiment;

FIG. 15 is a typical view showing a rechargeable vacuum cleaner according to a fifth embodiment; and FIG. 16 is a structural view of the rechargeable vacuum cleaner shown in FIG. 15.

DETAILED DESCRIPTION OF THE INVENTION

First Embodiment

Figure 1:
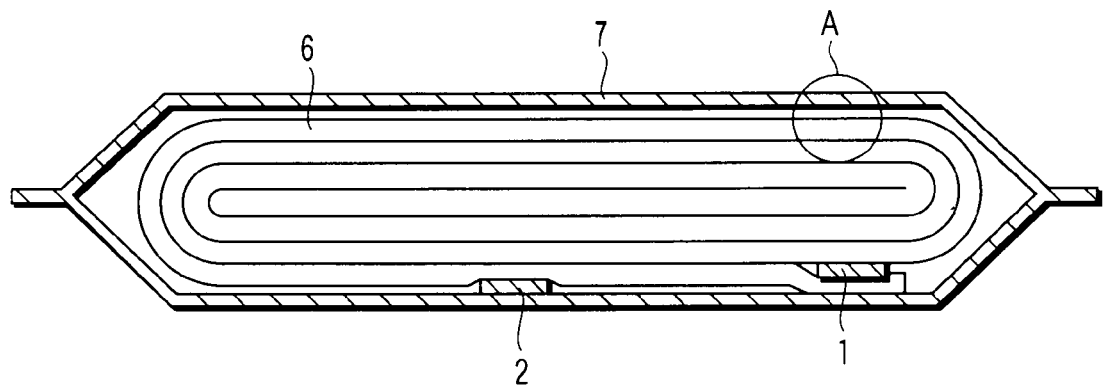
FIG. 1 is typical sectional view of a flat nonaqueous electrolyte secondary battery according to a second embodiment.

An active material according to a first embodiment contains a metal oxide represented by the following formula (1).

$$Li_xM1_aM2_bTiO_z \qquad (1)$$

where M1 represents at least one element selected from the group consisting of Zr, Ge, Si and Al, M2 represents at least one element selected from the group consisting of Cr, Mn, Fe, Ni and Sn, Ti has an oxidation number of +4, and x, a, b and z satisfy the following requirements: $0.01 \leq x \leq 0.2$, $0.005 \leq a \leq 0.1$, $0.005 \leq b \leq 0.1$ and $2 \leq z \leq 2.5$.

The inventors of the present invention have clarified the fact that when a composite oxide containing Ti as its structural element M is synthesized, the oxidation number of Ti in the obtained composite oxide is +2 in the aforementioned JP-A 7-230800 (KOKAI). This is because the composite oxide is synthesized by treating a starting material under heating to an atmosphere excluding oxygen, such as an inert gas atmosphere or under vacuum. Ti having an oxidation number of +2 contributes little to absorption and release of lithium. Also, $TiO_2$ having an anatase phase or a rutile phase has a large theoretical lithium absorption capacity and the oxidation number of Ti is +4. However, when $TiO_2$ is used as a negative electrode active material, only approximately half the capacity of the theoretical capacity is obtained.

The inventors of the present invention have found that the rate of the lithium absorption reaction is outstandingly improved without changing the structure of $TiO_2$ by compounding lithium in a minute or small amount falling in the following range: $0.01 \leq x \leq 0.2$ in an active material and keeping the oxidation number of Ti at +4, and as a result, attained a large charge/discharge capacity. Also, the inventors have found that the addition of a metal element M1 that forms a strong bond with oxygen strengthens the crystal structure of $TiO_2$ and at the same time, brings about a reduction in the degree of crystallization, leading to improvements in durability to a change in volume associated with the diffusion of lithium and in durability to a change in volume associated with the absorption and release reaction of lithium. As a result, a negative electrode active material superior in capacity and cycle performance is obtained. The inventors have also found that the rate performance of the active material is outstandingly improved by adding the metal element M2 providing an oxide having relatively high conductivity. It was previously difficult to disperse the metal element M2 in $TiO_2$, which was accomplished, for example, by forming a different phase in combination with the metal element M2, oxygen and titanium. However, the metal element M2 can be dispersed in $TiO_2$ by baking at 300 to 700° C. in an atmosphere containing oxygen, such as air, if it is made to coexist with M1.

The metal element M1 can provide an oxide stable at a potential range of 0.5 to 2 V (vs. Li/Li+), that does not adversely affect charge/discharge capacity and serves to strengthen a crystal structure. Also, it is considered that the metal element M2 contributes to the provision of conductivity to the active material. It is inferred that these effects bring about improvements in the utilization of the absorption site of lithium and in increase in the charge/discharge capacity. Also, durability to a change in the volume of a crystal lattice caused by the absorption and release of lithium can be improved. As a result, the metal oxide represented by the above formula (1) can improve the diffusion rate of lithium ions in a crystal structure and it is therefore possible to obtain a sufficient charge/discharge capacity, rate performance and cycle performance while containing at least one of an anatase crystal phase such as an anatase type $TiO_2$ phase and a rutile crystal phase such as a rutile type $TiO_2$ Phase.

Preferable examples of combinations of the elements M1 and M2 include a case of using Si as the element M1 and Mn as the element M2, a case of using Si as the element M1 and Cr as the element M2, a case of using Zr as the element M1 and Fe as the element M2, a case of using Zr as the element M1 and Mn as the element M2 and a case of using Al as the element M1 and Fe as the element M2. If any of these combinations is used, the charge/discharge capacity, rate performance and cycle performance can be improved in a well-balanced manner.

The content of an element constituting the metal oxide will be explained. As to the molar ratio (Li/Ti) of Li to Ti, the content of x of Li is preferably in the range of 0.01 to 0.2 to obtain satisfactory performance-improving effects. When the molar ratio (Li/Ti) is less than the above range, the effects of improving cycle performance and increasing capacity are insufficient. When the molar ratio (Li/Ti) exceeds the above range, composite oxides of Li—Ti—O are easily produced in the synthesis. The content x of Li is more preferably in the range of 0.02 or more and 0.1 or less. In this case, the content x of Li in the negative electrode active material may be varied in the following range, depending on the charge/discharge reaction in the battery: $0.01 \leq x \leq 1$.

Also, in order to likewise obtain sufficient performance-improving effects, the contents a and b of the elements M1 and M2 are respectively preferably 0.005 or more and 0.1 or less. When the content of each of these elements is less than this range, only insufficient performance-improving effects are obtained. Also, when the content of each of these elements exceeds this range, a phase different from a $TiO_2$ phase is generated. It is more preferable that the contents a and b of the elements M1 and M2 be respectively 0.01 or more and 0.08 or less.

The metal oxide represented by the above formula (1) is synthesized, for example, by the method explained below. First, a compound containing Li and the elements M1 and M2 is added to a $TiO_2$ raw material. Or a lithium compound, a compound of the metal elements M1 and a compound of the metal elements M2 are added to a $TiO_2$ raw material. The reaction in which each compound is added to the $TiO_2$ raw material may be occur in a solid phase or liquid phase. The obtained precursor is baked at 300 to 700° C. in, for example, an atmosphere containing oxygen, such as air, to obtain the aforementioned metal oxide. In order for Ti to maintain an oxidation number of 4, it is necessary for the baking atmosphere to contain oxygen. This is because when the oxidation number of Ti is reduced, the amount of lithium ion which can be absorbed into an active material by charge is reduced, resulting in a reduction in the capacity of the active material.

It is important to carry out the baking in such a manner that the elements to be added are distributed uniformly in the active material, to improve ionic conductivity by dispersion of lithium in a crystal. The appropriate baking temperature depends on the elements to be added. When the baking temperature is low, a long time is required to obtain a uniform material through in-solid diffusion and therefore, the precursor is preferably manufactured by mixing or reacting in a liquid phase. It is particularly preferable to use a method in which the precursor is obtained from an aqueous solution by a coprecipitation method or a method in which a precursor gel containing the elements to be added is obtained by a sol-gel method.

The metal oxide preferably has a primary particle diameter of 10 nm or more and 10 μm or less. The particle diameter and specific surface area of the active material affect the rate of the absorption/release reaction of lithium and therefore have a large influence on negative electrode performance. However, if the primary particle diameter is in the above range, the battery can exhibit its performance stably. The primary particle diameter is more preferably in the range of 20 nm to 5 μm.

The oxidation number of Ti contained in the metal oxide can be detected by the measurement of the X-ray absorption near-edge structure (XANES) spectrum and in contrast with the spectrum of a standard sample. As the standard sample, a material of which the oxidation number of Ti is known, for example, $TiO_2$ (rutile), $TiO_2$ (anatase), $Ti_2O_3$, TiO or a Ti-metal is used.

Each embodiment will be explained with reference to the drawings. Structures common to these embodiments are expressed by the same symbols and duplicated explanations are omitted. Also, each view is a typical view for explanation of the invention and for promoting the understanding of the invention. Although there is the case where the shapes, dimensions, and dimensional ratios of apparatuses shown in each drawing are different from those of actual apparatuses, they may be properly modified taking the following explanations and known technologies into consideration.

Second Embodiment

A nonaqueous electrolyte battery according to a second embodiment has a structure in which the active material according to the first embodiment is used for the negative electrode. In the nonaqueous electrolyte battery before charge and discharge operations are performed, the composition of the metal oxide is represented by the formula (1). However, once these charge and discharge operations are carried out, the amount x of Li is allowed to be increased or decreased in the following range: $0.01 \leqq x \leqq 1$ and there is therefore the case where the composition of the metal oxide differs from that represented by the formula (1). When the composition of the metal oxide is represented by the formula (1) under the condition that at least the negative electrode potential is 2.1 V (vs. $Li/Li^+$) or more and 3.2 V (vs. $Li/Li^+$) or less, a satisfactory charge/discharge capacity, rate performance and cycle performance can be obtained. The potential of the negative electrode incorporated into the nonaqueous electrolyte battery before the charge/discharge operations are carried out is 2.1 V (vs. $Li/Li^+$) or more and 3.2 V (vs. $Li/Li^+$) or less.

An example of the structure of the nonaqueous electrolyte battery according to the second embodiment will be described with reference to FIGS. 1 and 2.

As shown in FIG. 1, a flat-shape coiled electrode group 6 is housed in an outer package member 7. The coiled electrode group 6 has a structure in which a positive electrode 3 and a negative electrode 4 are spirally coiled with a separator 5 interposed therebetween. A nonaqueous electrolyte is held in the coiled electrode group 6.

Figure 2:
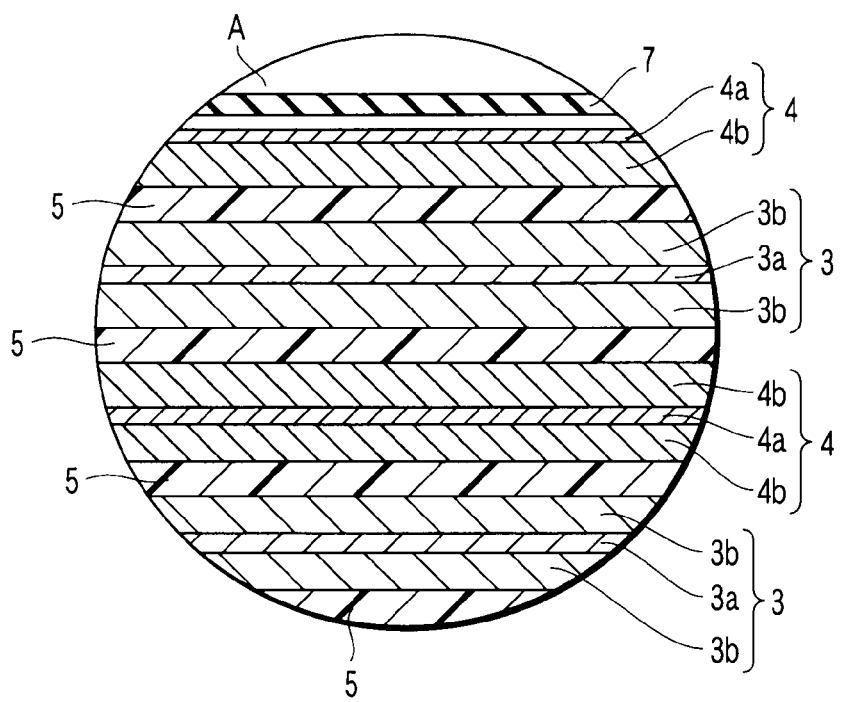
FIG. 2 is a typical view of the partial section showing the part enclosed by the circle A in FIG. 1 in detail.

As shown in FIG. 2, the negative electrode 4 is positioned on the outermost periphery of the coiled electrode group 6, and the positive electrodes 3 and the negative electrodes 4 are alternately laminated with the separator 5 interposed therebetween in such a manner that on the inside periphery of the negative electrode 4, separator 5, positive electrode 3, separator 5, negative electrode 4, separator 5, positive electrode 3, separator 5 . . . are laminated in this order. The negative electrode 4 comprises a negative electrode current collector 4a and a negative electrode layer 4b supported by the negative electrode current collector 4a. The negative electrode layer 4b is formed on only one surface of the negative electrode current collector 4a at a part positioned on the outermost periphery of the electrode group 6. The positive electrode 3 comprises a positive electrode current collector 3a and a positive electrode layer 3b supported by the positive electrode current collector 3a.

As shown in FIG. 1, a band-shaped positive electrode terminal 1 is electrically connected to the positive electrode current collector 3a in the vicinity of the outer peripheral end of the coiled electrode group 6. On the other hand, a band-shaped negative electrode terminal 2 is electrically connected to the negative electrode current collector 4a in the vicinity of the outer peripheral end of the coiled electrode group 6. Each end of the positive electrode terminal 1 and the negative electrode terminal 2 is drawn externally from the same side of the outer package member 7.

The negative electrode, nonaqueous electrolyte, positive electrode, separator, outer package member, positive electrode terminal and negative electrode terminal will be explained in detail.

1) Negative Electrode

The negative electrode comprises a negative selectrode current collector and a negative electrode layer which is supported on one surface or both surfaces of the negative electrode current collector and includes a negative electrode active material, a negative electrode conductive agent and a binder.

Examples of the negative electrode conductive agent which improves current collection performance and suppresses the contact resistance with the current collector may include acetylene black, carbon black and graphite.

Examples of the binder that combines the negative electrode active material with the negative electrode conductive agent include polytetrafluoroethylene (PTFE), polyvinylidene fluoride (PVdF), fluorine type rubber and styrene butadiene rubber.

The thickness of the negative electrode layer is preferably in the range of 10 to 150 µm. Therefore, in the case where the negative electrode layer is supported on each surface of the negative electrode current collector, the total thickness of the negative electrode layers is in the range of 20 to 300 µm. The thickness of the negative electrode layer on one surface is more preferably 30 to 100 µm. When the thickness of the negative electrode layer is in this range, the large-current discharge performance and cycle life are remarkably improved.

As to the compounding ratio of the negative electrode active material, the negative electrode conductive agent and the binder, it is preferable that the negative electrode active material be 70% by weight or more and 96% by weight or less, the negative electrode conductive agent be 2% by weight or more and 28% by weight or less and the binder be 2% by weight or more and 28% by weight or less. When the amount of the negative electrode conductive agent is less than 2% by weight, the current collection performance of the negative electrode layer is deteriorated and there is therefore the possibility of the nonaqueous electrolyte battery being deteriorated in large-current performance. Also, when the amount of the binder is less than 2% by weight, there is a fear that the binding ability between the negative electrode layer and the negative electrode current collector is reduced, leading to a deterioration in cycle performance. On the other hand, the amounts of the negative electrode conductive agent and binder are respectively 28% by weight or less from the viewpoint of achieving high capacity.

As the negative electrode current collector, copper, nickel or stainless steel which is electrochemically stable at the lithium ion absorption and release potential of the negative electrode active material is preferable. The thickness of the negative electrode current collector is preferably 5 to 20 µm. This is because, if the thickness of the negative electrode current collector is in the above range, the strength of the electrode is balanced with a reduction in the weight of the electrode.

The negative electrode is produced, for example, by coating the negative electrode current collector with a slurry prepared by suspending the negative electrode active material, negative electrode conductive agent and binder in a common solvent, and drying the coating layer to produce a negative electrode layer, followed by pressing. Alternatively, the negative electrode active material, negative electrode conductive agent and binder may be formed into a pellet form, which is used as the negative electrode layer.

2) Nonaqueous Electrolyte

Examples of the nonaqueous electrolyte include a liquid-form nonaqueous electrolyte prepared by dissolving an electrolyte in an organic solvent and a gel-form nonaqueous electrolyte prepared by compounding the liquid-form nonaqueous electrolyte and a polymer material.

The liquid-form nonaqueous electrolyte is prepared by dissolving an electrolyte in a concentration of 0.5 mol/l or more and 2.5 mol/l or less in an organic solvent.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$) and bistrifluoromethylsulfonylimide lithium [$LiN(CF_3SO_2)_2$], or mixtures of these compounds. Those which are scarcely oxidized at a high potential are preferable and $LiPF_6$ is most preferable.

Examples of the organic solvent may include single or mixed solvents of cyclic carbonates such as propylene carbonate (PC), ethylene carbonate (EC) and vinylene carbonate; chain carbonates such as diethyl carbonate (DEC), dimethyl carbonate (DMC) and methyl ethyl carbonate (MEC); cyclic ethers such as tetrahydrofuran (THF), 2-methyltetrahydrofuran (2MeTHF) and dioxolan (DOX); chain ethers such as dimethoxyethane (DME) and diethoxyethane (DEE); γ-butyrolactone (GBL); acetonitrile (AN); and sulfolane (SL).

Examples of the polymer material may include polyvinylidene fluoride (PVdF), polyacrylonitrile (PAN) and polyethylene oxide (PEO).

As the nonaqueous electrolyte, for example, an ionic liquid containing a lithium ion, polymer solid electrolyte or inorganic solid electrolyte may be used.

The ionic liquid indicates compounds in a liquid state at normal temperature (15° C. to 25° C.) among organic salts obtained by combinations of organic cations and anions. Examples of the ionic liquid include those existing singly in a liquid state, those which are made into a liquid by being mixed with an electrolyte and those made into a liquid by being dissolved in an organic solvent. Generally, the melting point of the ionic liquid used in a nonaqueous electrolyte battery is 25° C. or less. Also, an organic cation generally has a quaternary ammonium skeleton.

The polymer solid electrolyte is prepared by dissolving an electrolyte in a polymer material to solidify.

The inorganic solid electrolyte is a solid material having a lithium ion conductivity.

3) Positive Electrode

The positive electrode comprises a positive electrode current collector and a positive electrode layer which is supported on one surface or both surfaces of the positive electrode current collector and includes a positive electrode active material, a positive electrode conductive agent and a binder.

Examples of the positive electrode active material include oxides, sulfides and polymers.

Examples of the oxides include manganese dioxide ($MnO_2$) occluded with lithium, iron oxide, copper oxide, nickel oxide, lithium-manganese composite oxide (for example, $Li_xMn_2O_4$ or $Li_xMnO_2$), lithium-nickel composite oxide (for example, $Li_xNiO_2$), lithium-cobalt composite oxide (for example, $Li_xCoO_2$), lithium-nickel-cobalt composite oxide (for example, $LiNi_{1-y}CO_yO_2$), lithium-manganese-cobalt composite oxide (for example, $LiMn_yCo_{1-y}O_2$), spinel type lithium-manganese-nickel composite oxide (for example, $Li_xMn_{2-y}Ni_yO_4$), lithium phosphate having an olivine structure (for example, $Li_xFePO_4$, $Li_xFe_{1-y}Mn_yPO_4$ and $Li_xCoPO_4$), iron sulfate (for example, $Fe_2(SO_4)_3$), vanadium oxide (for example, $V_2O_5$) and lithium-nickel-cobalt-manganese composite oxide. Here, x and y are respectively preferably in the range of 0 to 1.

Examples of the polymer include conductive polymer materials such as polyaniline and polypyrrole and disulfide polymer materials. Besides the above compounds, sulfur (S), fluorinated carbon and the like may be used.

Examples of the positive electrode active materials that can provide a high positive electrode voltage include lithium-manganese composite oxide (for example, $Li_xMn_2O_4$), lithium-nickel composite oxide (for example, $Li_xNiO_2$), lithium-cobalt composite oxide (for example, $Li_xCoO_2$), lithium-nickel-cobalt composite oxide (for example, $Li_xNi_{1-y}Co_yO_2$), spinel type lithium-manganese-nickel composite oxide (for example, $Li_xMn_{2-y}Ni_yO_4$), lithium-manganese-cobalt composite oxide (for example, $Li_xMn_yCo_{1-y}O_2$), iron lithium phosphate (for example, $Li_xFePO_4$) and lithiumnickel-cobalt-manganese composite oxide. Here, x and y are respectively preferably in the range of 0 to 1.

Particularly, a lithium-nickel composite oxide is preferably contained as the positive electrode active material. This is because the initial efficiency of this lithium-nickel composite oxide is close to the initial efficiency of the negative electrode active material.

When a nonaqueous electrolyte containing an ionic liquid is used, it is preferable to use iron lithium phosphate, $Li_xVPO_4F$, lithium-manganese composite oxide, lithium-nickel composite oxide, or lithium-nickel-cobalt composite oxide from the viewpoint of cycle life. This is because the use of such a material reduces the reactivity between the above positive electrode active material and the ionic liquid.

Examples of the positive electrode active material for primary batteries include manganese dioxide, iron oxide, copper oxide, iron sulfide and fluorinated carbon.

The primary particle diameter of the positive electrode active material is preferably 100 nm or more and 1 μm or less. When the primary particle diameter is 100 nm or more, a positive electrode active material is easily handled in industrial production. When the primary particle diameter is 1 μm or less, lithium ions can be smoothly diffused in a solid.

The specific surface area of the positive electrode active material is preferably 0.1 $m^2$/g or more and 10 $m^2$/g or less. When the specific surface area of the positive electrode active material is 0.1 $m^2$/g or more, sufficient sites for absorption and release of lithium ions can be secured. When the specific surface area of the positive electrode active material is 10 $m^2$/g or less, this material can be easily handled industrially and therefore, good charge/discharge cycle performance can be secured.

Examples of the positive electrode conductive agent used to improve the current collection ability and to suppress contact resistance with the current collector may include carbonaceous materials such as acetylene black, carbon black and graphite.

Examples of the binder used to bind the positive electrode active material with the positive electrode conductive agent include polytetrafluoroethylene (PTFE), polyvinylidene fluoride (PVdF) and fluorine type rubber.

The thickness of the positive electrode layer on one surface is preferably in the range of 10 μm to 150 μm from the viewpoint of the large-current discharge performance and cycle life of the battery. Therefore, when the positive electrode layer is supported on each surface of the positive electrode current collector, the total thickness of the positive electrode layers is preferably in the range of 20 μm to 300 μm. The thickness of the positive electrode layer on one surface is preferably in the range of 30 μm to 120 μm. If the thickness of the positive electrode layer is in this range, the battery is improved in large-current discharge performance and cycle life.

As to the compounding ratio of the positive electrode active material, positive electrode conductive agent and binder, it is preferable that the positive electrode active material be 80% by weight or more and 95% by weight or less, the positive electrode conductive agent be 3% by weight or more and 18% by weight or less and the binder be 2% by weight or more and 17% by weight or less. When the amount of the positive electrode conductive agent is 3% by weight or more, the aforementioned effect can be exhibited whereas when the amount of the positive electrode conductive agent is 18% by weight or less, the decomposition of the nonaqueous electrolyte on the surface of the positive electrode conductive agent under high-temperature condition can be reduced. With regard to the binder, when the amount of the binder is 2% by weight or more, satisfactory electrode strength is obtained whereas when the amount of the binder is 17% by weight or less, the compounding amount of the insulation material of the electrode is reduced whereby internal resistance can be reduced.

The positive electrode is manufactured, for example, in the following manner: the positive electrode active material, positive electrode conductive agent and binder are suspended in an appropriate solvent and the suspended and prepared slurry is applied to the positive electrode current collector and dried to manufacture a positive electrode layer, which is then subjected to pressing. Alternatively, the positive electrode active material, positive electrode conductive agent and binder may be made into a pellet form to use the pellet as the positive electrode layer.

As the positive electrode current collector, an aluminum foil or an aluminum alloy foil is preferably used.

The thickness of the aluminum foil or aluminum alloy foil is preferably from 5 μm to 20 μm and more preferably 15 μm or less. The purity of the aluminum foil is preferably 99% or more. As the aluminum alloy, an alloy containing elements such as magnesium, zinc or silicon is preferable. On the other hand, the content of transition metals such as iron, copper, nickel and chromium is preferably limited to 1% or less.

4) Separator

Examples of the material used as the separator include porous films containing polyethylene, polypropylene, cellulose or polyvinylidene fluoride (PVdF) and nonwoven fabrics made of synthetic resins. Among these materials, porous films made of polyethylene or polypropylene can be melted at a fixed temperature to make it possible to cut off current and are therefore preferable from the viewpoint of heightening safety.

5) Outer Package Member

Examples of the outer package member include a laminate film case having a wall thickness of 0.2 mm or less and a metal case having a wall thickness of 0.5 mm or less. The wall thickness of the metal case is more preferably 0.2 mm or less.

Examples of the shape of the outer package member include a flat type, rectangular type, cylinder type, coin type, button type, sheet type and laminate type. As to the nonaqueous electrolyte battery, of course, small batteries to be mounted on portable electronic devices and large batteries to be mounted on two-wheel to four-wheel cars may be included.

The laminate film is a multilayer film consisting of a metal layer and a resin layer with which the metal layer is coated. To develop a light-weight battery, the metal layer is preferably an aluminum foil or an aluminum alloy foil. The resin layer serves to reinforce the metal layer and polymers such as polypropylene (PP), polyethylene (PE), nylon and polyethylene terephthalate (PET) may be used. The laminate film case may be formed by carrying out thermal fusion to seal the laminate film.

Examples of the material of the metal case include aluminum and aluminum alloys. As the aluminum alloy, alloys containing an element such as magnesium, zinc or silicon are preferable. On the other hand, the content of transition metals such as iron, copper, nickel or chromium is preferably designed to be 1% or less. This makes it possible to outstandingly improve long-term reliability in a high-temperature condition and radiation ability.

6) Negative Electrode Terminal

The negative electrode terminal may be formed from a material having electric stability and conductivity at aforementioned negative electrode potential range. Example of this material include copper, nickel and stainless. In order to reduce contact resistance, the material is preferably the same as that of the negative electrode current collector.

7) Positive Electrode Terminal

The positive electrode terminal may be formed from a material having electric stability and conductivity at a potential range from 3 V to 5 V with respect to a lithium metal potential. Example of this material include aluminum and aluminum alloys containing elements such as Mg, Ti, Zn, Mn, Fe, Cu and Si. In order to reduce contact resistance, the material is preferably the same as that of the positive electrode current collector.

With regard to an example of the nonaqueous electrolyte battery according to the second embodiment, the case where an electrode group including a positive electrode and a negative electrode has a coiled structure has been explained with reference to FIGS. 1 and 2. However, the electrode group may have a laminate structure. One example of such is shown in FIGS. 3 and 4.

Figure 3:
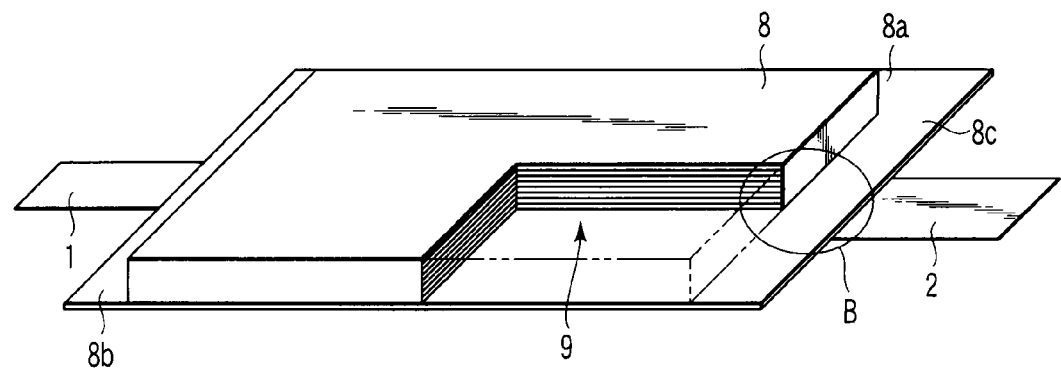
FIG. 3 is a partially broken perspective view showing another nonaqueous electrolyte battery according to the second embodiment.
Figure 4:
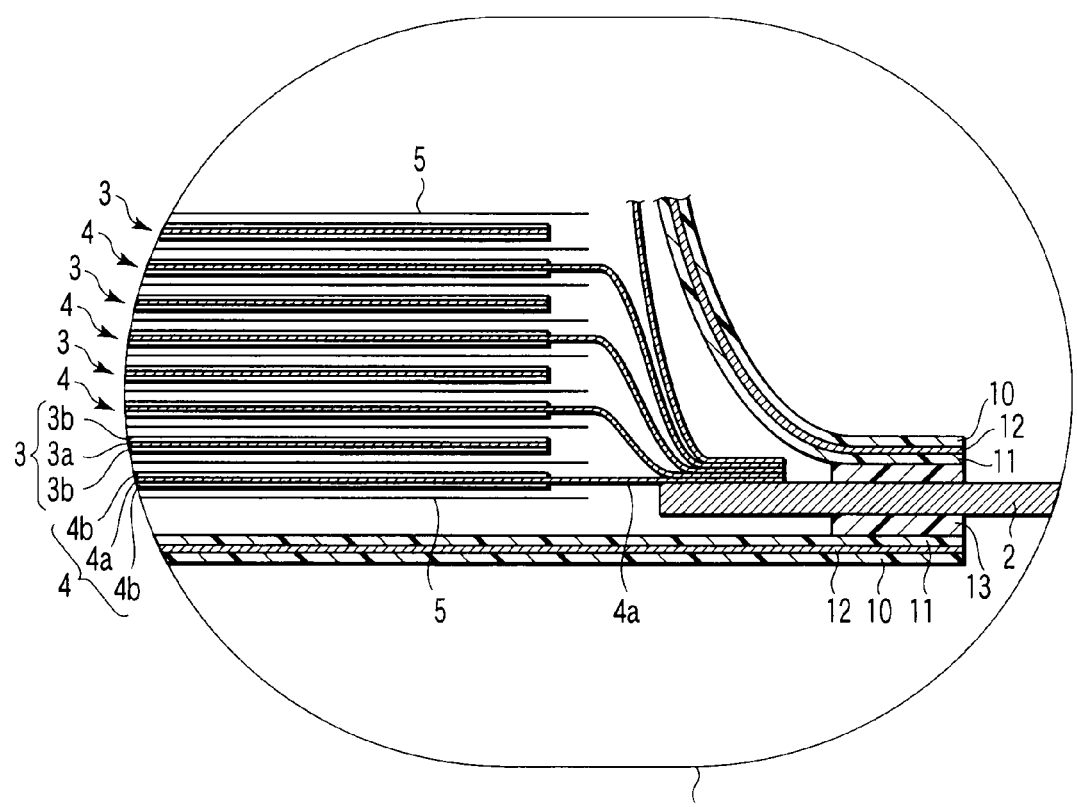
FIG. 4 is a typical view of the partial section showing the part enclosed by the circle B in FIG. 3 in detail.

As shown in FIG. 3, a laminate type electrode group 9 is housed in an outer package member 8 made of a laminate film. The laminate film is provided with a resin layer 10, a thermoplastic resin layer 11, and a metal layer 12 disposed between the resin layer 10 and the thermoplastic resin layer 11 as shown in FIG. 4. The thermoplastic resin layer 11 is positioned on the inside surface of the outer package member 8. Heat seal parts 8a, 8b and 8c are formed by thermal fusion of the thermoplastic resin layer 11 on one long side and both short sides of the outer package member 8 made of a laminate film. The outer package member 8 is sealed by these heat seal parts 8a, 8b and 8c.

The laminate type electrode group 9 comprises plural positive electrodes 3, plural negative electrodes 4 and a separator 5 interposed between each positive electrode 3 and each negative electrode 4. The laminate type electrode group 9 has a structure in which the positive electrode 3 and the negative electrode 4 are alternately laminated with the separator 5 interposed therebetween as shown in FIG. 4. Each positive electrode 3 comprises a positive electrode current collector 3a and a positive electrode layer 3b supported on both surfaces of the positive electrode current collector 3a. Each negative electrode 4 comprises a negative electrode current collector 4a and a negative electrode layer 4b supported on both surfaces of the negative electrode current collector 4a. One short side of each of the negative electrode current collectors 4a of the negative electrodes 4 is projected from the positive electrode 3. The negative electrode current collector 4a projected from the positive electrode 3 is electrically connected to a band-like negative electrode terminal 2. The end of the band-like negative electrode terminal 2 is drawn externally through the heat seal part 8c of the outer package member 8. Both surfaces of the negative electrode terminal 2 face the thermoplastic resin layer 11 constituting the heat seal part 8c. An insulating film 13 is interposed between each surface of the negative electrode terminal 2 and the thermoplastic resin layer 11 to improve the binding strength between the heat seal part 8c and the negative electrode terminal 2. Examples of the insulating film 13 may include films formed from materials obtained by adding an acid anhydride to polyolefin containing at least one of polypropylene and polyethylene.

Though not shown here, one short side of each of the positive electrode current collectors 3a of the positive electrodes 3 is projected from the negative electrode 4. The positive electrode current collector 3a and the negative electrode current collector 4a are projected in directions opposite to each other. The positive electrode current collector 3a projected from the negative electrode 4 is electrically connected to the band-like positive electrode terminal 1. The end of the band-like positive electrode terminal 1 is drawn externally through the heat seal part 8b of the outer package member 8. In order to improve the binding strength between the heat seal 8b and the positive electrode terminal 1, an insulating film 13 is interposed between the positive electrode terminal 1 and the thermoplastic resin layer 11. The positive electrode terminal 1 and the negative electrode terminal 2 are drawn in directions opposite to each other from the outer package member 8.

Figure 5:
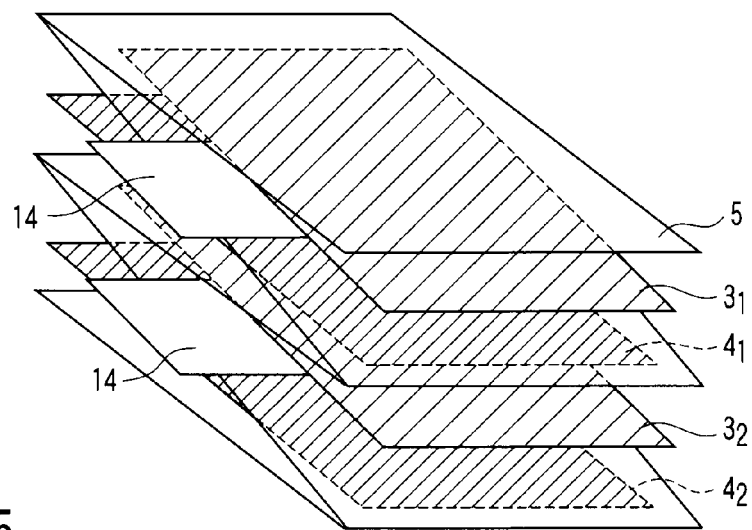
FIG. 5 is a perspective view typically showing an electrode group having a laminate structure used in the nonaqueous electrolyte battery according to the second embodiment.

When the electrode group including the positive electrode and negative electrode has the laminated structure, the separator may have a zigzag structure as shown in FIG. 5. A band-shaped separator 5 is folded in a zigzag shape. A strip-like positive electrode $3_1$, a strip-like negative electrode $4_1$, a strip-like positive electrode $3_2$ and a strip-like negative electrode $4_2$ are inserted in this order from above into the overlapped part of the separators 5. A positive electrode terminal 14 is drawn from each short side of the strip-like positive electrodes $3_1$ and $3_2$. An electrode group having a laminate structure is obtained by alternately disposing the positive electrode 3 and the negative electrode 4 between the overlapped parts of the separator 5 folded in a zigzag shape in this manner.

When the separator is folded in a zigzag shape, three sides of each of the positive electrode and negative electrode are brought into direct contact with the nonaqueous electrolyte not through the separator and therefore, the nonaqueous electrolyte is smoothly moved to the electrode. Therefore, even if the nonaqueous electrolyte is consumed on the surface of the electrode during long-term use, the nonaqueous electrolyte is smoothly supplied, with the result that an excellent large-current performance (output/input performance) can be attained over a long period of time.

Figure 6:
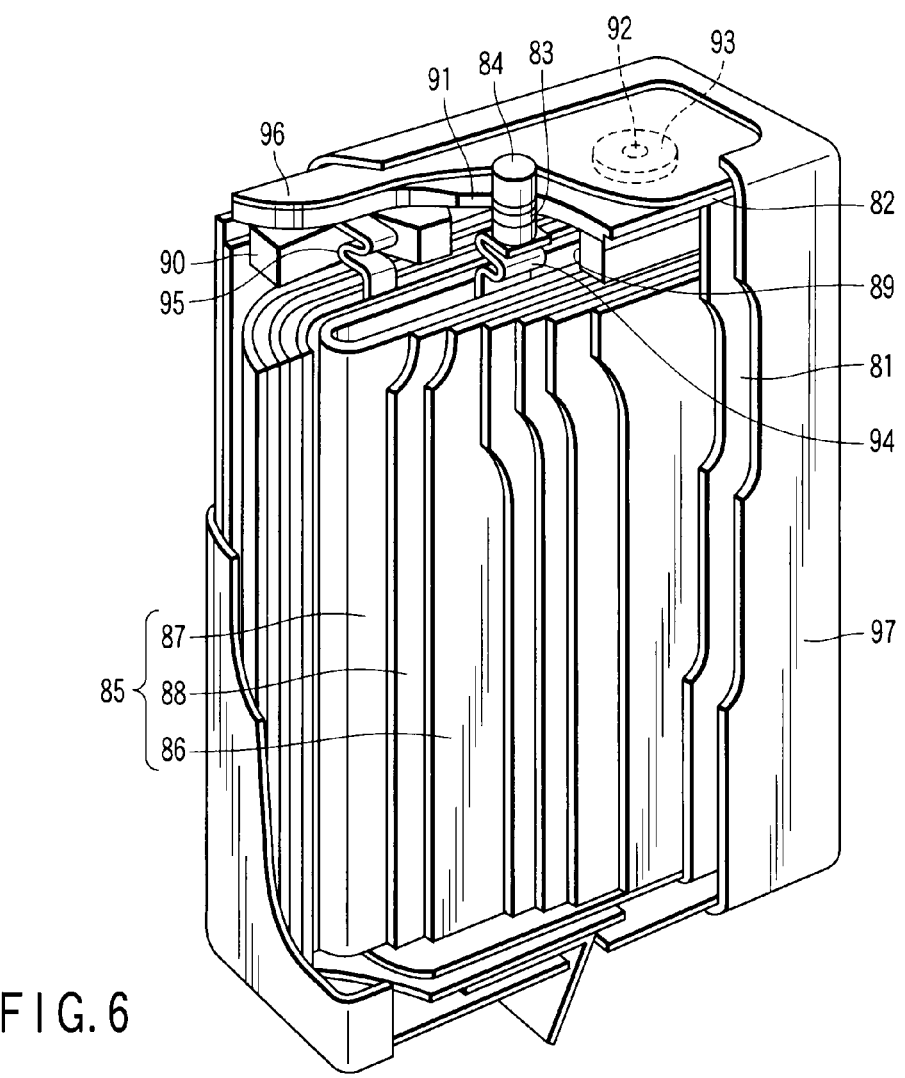
FIG. 6 is a partially broken perspective view showing a rectangular nonaqueous electrolyte battery according to the second embodiment.

The case made of a laminate film as shown in FIGS. 1 to 5 is not always used for the nonaqueous electrode battery according to the embodiment, and a metal case as shown in FIG. 6 may also be used.

The outer package member includes a case 81 made of aluminum or aluminum alloy and having a rectangular cylindrical shape with a bottom, a lid 82 disposed at the opening of the case 81, and a negative electrode terminal 84 attached at the lid 82 via an insulation material 83. The case 81 also serves as a positive electrode terminal. Aluminum or an aluminum alloy having the above-mentioned composition may be used for the case 81.

An electrode group 85 is housed in the case 81. The electrode group 85 has a structure in which a positive electrode 86 and a negative electrode 87 are coiled in a flat shape with a separator 88 disposed therebetween. This electrode group 85 is obtained in the following manner: for example, a band-like product obtained by laminating the positive electrode 86, the separator 88 and the negative electrode 87 in this order is coiled in a spiral form by using a plate or cylindrical core such that the positive electrode 86 is positioned on the outside, and the obtained coiled product is molded under pressure in the radial direction.

The nonaqueous electrolytic solution (liquid nonaqueous electrolyte) is retained in the electrode group 85. A spacer 90 made of a synthetic resin having a lead outlet hole 89 near the center is disposed on the electrode group 85 in the case 81.

An outlet hole 91 of the negative electrode terminal 84 is open near the center of the lid 82. A liquid injection port 92 is provided at a position remote from the outlet hole 91 of the lid 82. The liquid injection port 92 is hermetically sealed with a sealing plug 93 after injecting the liquid nonaqueous electrolyte into the case 81. The negative electrode terminal 84 is hermetically sealed at the outlet hole 91 of the lid 82 with interposition of the insulation material 83 made of a glass or resin.

A negative electrode lead tab 94 is welded to the lower surface of the negative electrode terminal 84. The negative electrode lead tab 94 is electrically connected to the negative electrode 87. One end of a positive electrode lead 95 is electrically connected to the positive electrode 86, and the other end thereof is welded to the bottom face of the lid 82. The outer surface of the lid 82 is covered with an insulation paper sheet 96. An outer package tube 97 covers the entire side face of the case 81, and the upper and lower ends thereof are folded onto the upper surface and lower surface, respectively, of the battery.

Third Embodiment

A battery pack according to a third embodiment is provided with the nonaqueous electrolyte battery according to the second embodiment as a unit cell. The number of unit cells may be two or more. These unit cells are arranged in series or in parallel to form a battery module.

The unit cell according to the second embodiment is suitable for use as a battery module and the battery pack according to the third embodiment is superior in cycle performance. The reason for such features will be explained. Since the nonaqueous electrolyte battery according to the second embodiment is superior in charge/discharge cycle performance, it is therefore possible to remarkably reduce a variation in charge/discharge cycle performance between unit cells. Therefore, the charging and discharging of the battery pack according to the third embodiment can be assuredly and easily controlled, and an excellent charge/discharge cycle performance is obtained.

As the unit cell, the flat type nonaqueous electrolyte battery shown in FIGS. 1 to 6 may be used.

Figure 8:
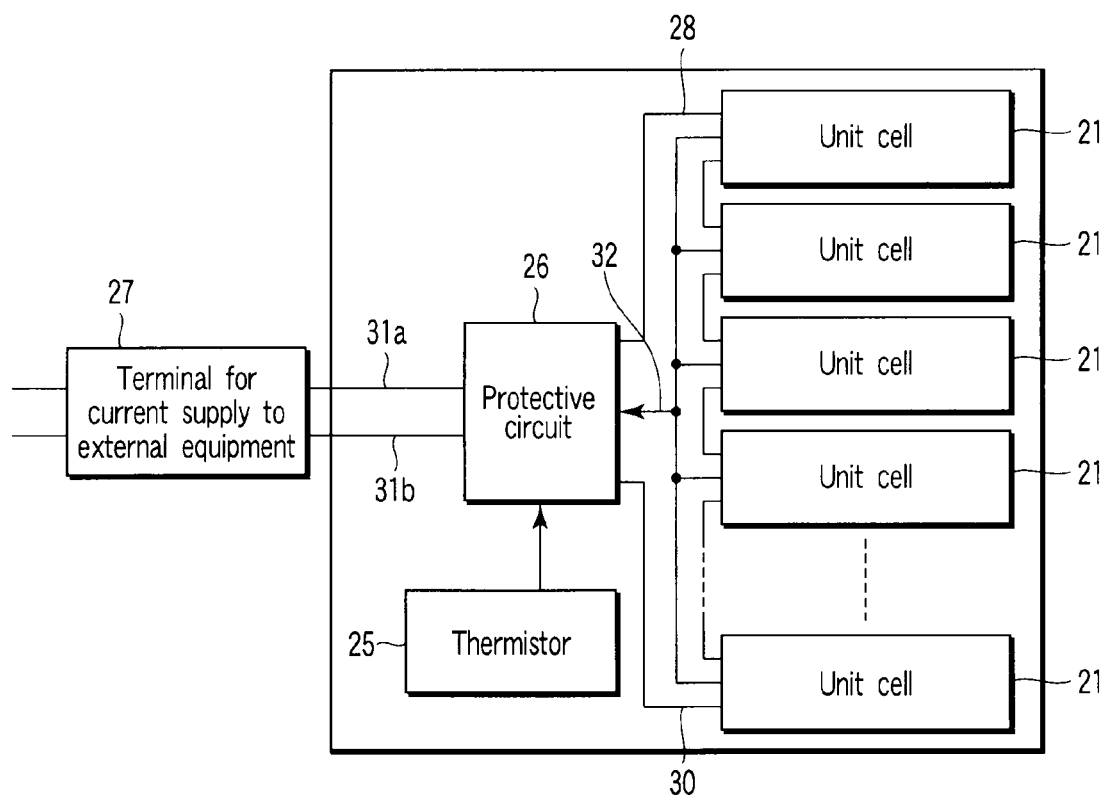
FIG. 8 is a block diagram showing an electrical circuit of the battery pack of FIG. 7.

Each of a plurality of unit cells 21 included in the battery pack shown in FIG. 7 is formed of, though not limited to, a flattened type nonaqueous electrolyte battery constructed as shown in FIG. 1. The plural unit cells 21 are stacked one upon the other in the thickness direction in a manner to align the protruding directions of the positive electrode terminals 1 and the negative electrode terminals 2. As shown in FIG. 8, the unit cells 21 are connected in series to form a battery module 22. The unit cells 21 forming the battery module 22 are made integral by using an adhesive tape 23 as shown in FIG. 7.

A printed wiring board 24 is arranged on the side surface of the battery module 22 toward which protrude the positive electrode terminals 1 and the negative electrode terminals 2. As shown in FIG. 8, a thermistor 25, a protective circuit 26 and a terminal 27 for current supply to the external equipment are connected to the printed wiring board 24.

As shown in FIGS. 7 and 8, a wiring 28 on the side of the positive electrodes of the battery module 22 is electrically connected to a connector 29 on the side of the positive electrode of the protective circuit 26 mounted to the printed wiring board 24. On the other hand, a wiring 30 on the side of the negative electrodes of the battery module 22 is electrically connected to a connector 31 on the side of the negative electrode of the protective circuit 26 mounted to the printed wiring board 24.

The thermistor 25 detects the temperature of the unit cell 21 and transmits the detection signal to the protective circuit 26. The protective circuit 26 is capable of breaking a wiring 31a on the positive side and a wiring 31b on the negative side, the wirings 31a and 31b being stretched between the protective circuit 26 and the terminal 27 for current supply to the external equipment. These wirings 31a and 31b are broken by the protective circuit 26 under prescribed conditions including, for example, the conditions that the temperature detected by the thermistor is higher than a prescribed temperature, and that the over-charging, over-discharging and over-current of the unit cell 21 have been detected. The detecting method is applied to the unit cells 21 or to the battery module 22. In the case of applying the detecting method to each of the unit cells 21, it is possible to detect the battery voltage, the positive electrode potential or the negative electrode potential. On the other hand, where the positive electrode potential or the negative electrode potential is detected, lithium metal electrodes used as reference electrodes are inserted into the unit cells 21.

In the case of FIG. 8, a wiring 32 is connected to each of the unit cells 21 for detecting the voltage, and the detection signal is transmitted through these wirings 32 to the protective circuit 26.

Protective sheets 33 each formed of rubber or resin are arranged on the three of the four sides of the battery module 22, though the protective sheet 33 is not arranged on the side toward which protrude the positive electrode terminals 1 and the negative electrode terminals 2. A protective block 34 formed of rubber or resin is arranged in the clearance between the side surface of the battery module 22 and the printed wiring board 24.

The battery module 22 is housed in a container 35 together with each of the protective sheets 33, the protective block 34 and the printed wiring board 24. To be more specific, the protective sheets 33 are arranged inside the two long sides of the container 35 and inside one short side of the container 35. On the other hand, the printed wiring board 24 is arranged along that short side of the container 35 which is opposite to the short side along which one of the protective sheets 33 is arranged. The battery module 22 is positioned within the space surrounded by the three protective sheets 33 and the printed wiring board 24. Further, a lid 36 is mounted to close the upper open edge of the container 35.

Incidentally, it is possible to use a thermally shrinkable tube in place of the adhesive tape 23 for fixing the battery module 22. In this case, the protective sheets 33 are arranged on both sides of the battery module 22 and, after the thermally shrinkable tube is wound about the protective sheets, the tube is thermally shrunk to fix the battery module 22.

The unit cells 21 shown in FIGS. 7 and 8 are connected in series. However, it is also possible to connect the unit cells 21 in parallel to increase the cell capacity. Of course, it is possible to connect the battery packs in series and in parallel.

Also, the embodiments of the battery pack can be changed appropriately depending on the use of the battery pack.

The battery pack of the third embodiment is preferably applied to uses where cycle performance under a large current is desired. Specific examples of the application of the battery pack include uses as power sources of digital cameras, and uses for vehicles such as two- to four-wheel hybrid electric cars, two- to four-wheel electric cars and power-assisted bicycles. The uses for vehicles are particularly preferable.

Fourth Embodiment

A vehicle according to a fourth embodiment is provided with the battery pack according to the third embodiment. Generally, a large current of about 10 C or more flows across a battery pack for vehicles. Because the unit cell according to the second embodiment is superior in rate performance, the use of the unit cell in a battery pack makes it possible to reduce a variation in capacity between unit cells when charging/discharging under a large current and therefore cycle performance of the battery pack under a large current can be improved. Therefore, the vehicle according to the fourth embodiment is superior in the retention of the characteristics of a driving source. Examples of the vehicles here include two- to four-wheel hybrid electric cars, two- to four-wheel electric cars and power-assisted bicycles.

Figure 9:
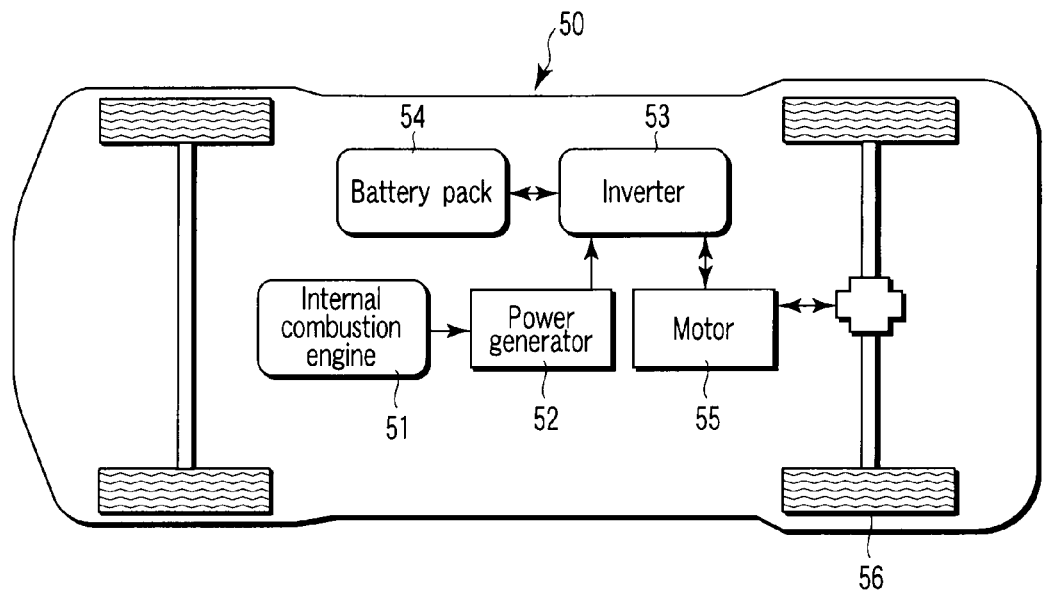
FIG. 9 is a typical view showing a series hybrid vehicle according to a fourth embodiment.
Figure 10:
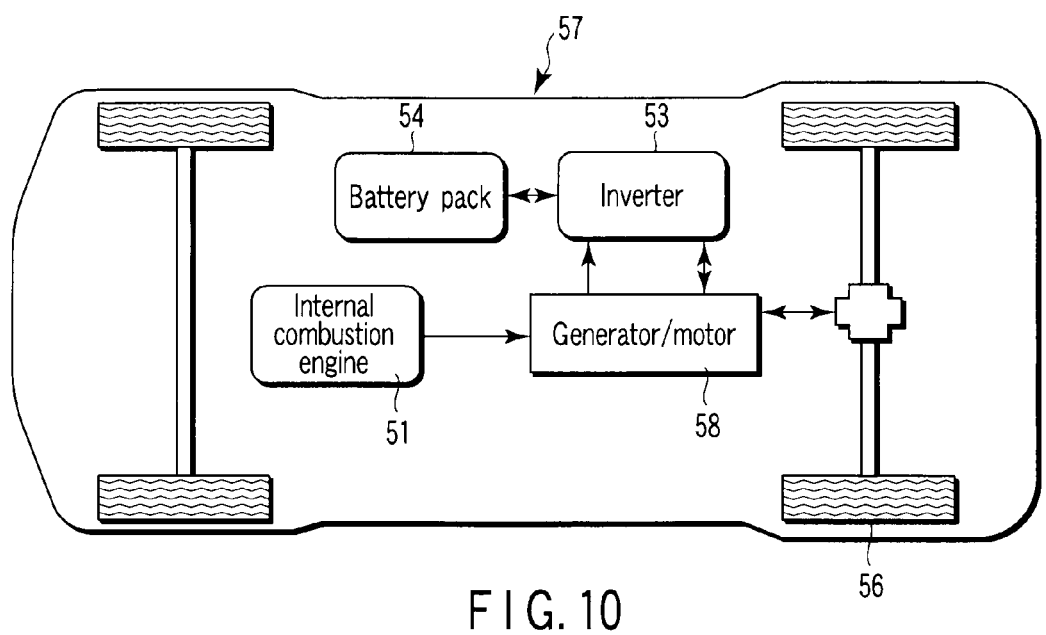
FIG. 10 is a typical view showing a parallel hybrid vehicle according to the fourth embodiment.

FIGS. 9 to 11 show various type of hybrid vehicles in which an internal combustion engine and a motor driven by a battery pack are used in combination as the power source for the driving. The hybrid vehicle can be roughly classified into three types depending on the combination of the internal combustion engine and the electric motor.

FIG. 9 shows a hybrid vehicle 50 that is generally called a series hybrid vehicle. The motive power of an internal combustion engine 51 is once converted entirely into an electric power by a power generator 52, and the electric power thus converted is stored in a battery pack 54 via an inverter 53. The battery pack according to the third embodiment is used as the battery pack 54. The electric power stored in the battery pack 54 is supplied to an electric motor 55 via the inverter 53, with the result that wheels 56 are driven by the electric motor 55. In other words, the hybrid vehicle 50 shown in FIG. 9 represents a system in which a power generator is incorporated into an electric vehicle. The internal combustion engine can be operated under highly efficient conditions and the kinetic energy of the internal combustion engine can be recovered as the electric power. On the other hand, the wheels are driven by the electric motor alone and, thus, the hybrid vehicle 50 requires an electric motor of a high output. It is also necessary to use a battery pack having a relatively large capacity. It is desirable for the rated capacity of the battery pack to fall within a range of 5 to 50 Ah, more desirably 10 to 20 Ah. Incidentally, the rated capacity noted above is the capacity at the time when the battery pack is discharged at a rate of 0.2 C.

FIG. 10 shows the construction of a hybrid vehicle 57 that is called a parallel hybrid vehicle. A reference numeral 58 shown in FIG. 10 denotes an electric motor that also acts as a power generator. The internal combustion engine 51 drives mainly the wheels 56. The motive power of the internal combustion engine 51 is converted in some cases into an electric power by the power generator 58, and the battery pack 54 is charged by the electric power produced from the power generator 58. In the starting stage or the accelerating stage at which the load is increased, the driving force is supplemented by the electric motor 58. The hybrid vehicle 57 shown in FIG. 10 represents a system based on the ordinary vehicle. In this system, the fluctuation in the load of the internal combustion engine 51 is suppressed so as to improve the efficiency, and the regenerative power is also obtained. Since the wheels 56 are driven mainly by the internal combustion engine 51, the output of the electric motor 58 can be determined arbitrarily depending on the required ratio of the assistance. The system can be constructed even in the case of using a relatively small electric motor 58 and a relatively small battery pack 54. The rated capacity of the battery pack can be set to fall within a range of 1 to 20 Ah, more desirably 3 to 10 Ah.

FIG. 11 shows the construction of a hybrid vehicle 59 that is called a series-parallel hybrid vehicle, which utilizes in combination both the series type system and the parallel type system. A power dividing mechanism 60 included in the hybrid vehicle 59 divides the output of the internal combustion engine 51 into the energy for the power generation and the energy for the wheel driving. The series-parallel hybrid vehicle 59 permits controlling the load of the engine more finely than the parallel hybrid vehicle so as to improve the energy efficiency.

It is desirable for the rated capacity of the battery pack to fall within a range of 1 to 20 Ah, more desirably 3 to 10 Ah.

It is desirable for the nominal voltage of the battery pack included in the hybrid vehicles as shown in FIGS. 9 to 11 to fall within a range of 200 to 600 V.

It is desirable for the battery pack 54 to be arranged in general in the site where the battery pack 54 is unlikely to be affected by the change in the temperature of the outer atmosphere and unlikely to receive an impact in the event of a collision. In, for example, a sedan type automobile shown in FIG. 12, the battery pack 54 can be arranged within a trunk room rearward of a rear seat 61. The battery pack 54 can also be arranged below or behind the rear seat 61. Where the battery has a large weight, it is desirable to arrange the battery pack 54 below the seat or below the floor in order to lower the center of gravity of the automobile.

An electric vehicle (EV) is driven by the energy stored in the battery pack that is charged by the electric power supplied from outside the vehicle. Since all the power required for the driving of the vehicle is produced by an electric motor, it is necessary to use an electric motor of a high output. In general, it is necessary to store all the energy required for one driving in the battery pack by one charging. It follows that it is necessary to use a battery pack having a very large capacity. It is desirable for the rated capacity of the battery pack to fall within a range of 100 to 500 Ah, more desirably 200 to 400 Ah.

The weight of the battery pack occupies a large ratio of the weight of the vehicle. Therefore, it is desirable for the battery pack to be arranged in a low position that is not markedly apart from the center of gravity of the vehicle. For example, it is desirable for the battery pack to be arranged below the floor of the vehicle. In order to allow the battery pack to be charged in a short time with a large amount of the electric power required for the one driving, it is necessary to use a charger of a large capacity and a charging cable. Therefore, it is desirable for the electric vehicle to be equipped with a charging connector connecting the charger and the charging cable. A connector utilizing the electric contact can be used as the charging connector. It is also possible to use a non-contact type charging connector utilizing the inductive coupling.

Figure 13:
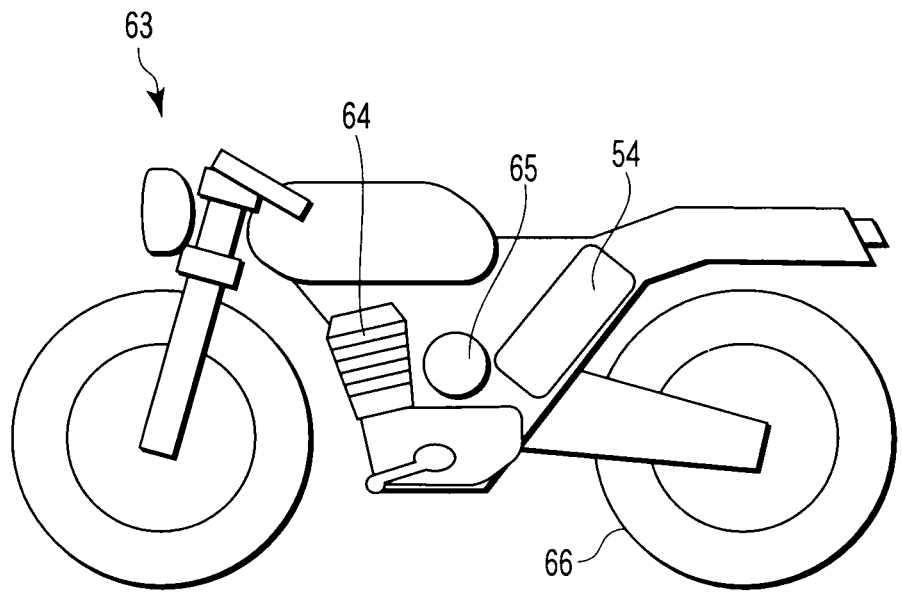
FIG. 13 is a typical view showing a hybrid motor bicycle according to the fourth embodiment.

FIG. 13 exemplifies the construction of a hybrid motor bicycle 63. It is possible to construct a hybrid motor bicycle 63 exhibiting a high energy efficiency and equipped with an internal combustion engine 64, an electric motor 65, and the battery pack 54 like the hybrid vehicle. The internal combustion engine 64 drives mainly the wheels 66. In some cases, the battery pack 54 is charged by utilizing a part of the motive power generated from the internal combustion engine 64. In the starting stage or the accelerating stage in which the load of the motor bicycle is increased, the driving force of the motor bicycle is supplemented by the electric motor 65. Since the wheels 66 are driven mainly by the internal combustion engine 64, the output of the electric motor 65 can be determined arbitrarily based on the required ratio of the supplement. The electric motor 65 and the battery pack 54, which are relatively small, can be used for constructing the system. It is desirable for the rated capacity of the battery pack to fall within a range of 1 to 20 Ah, more desirably 3 to 10 Ah.

Figure 14:
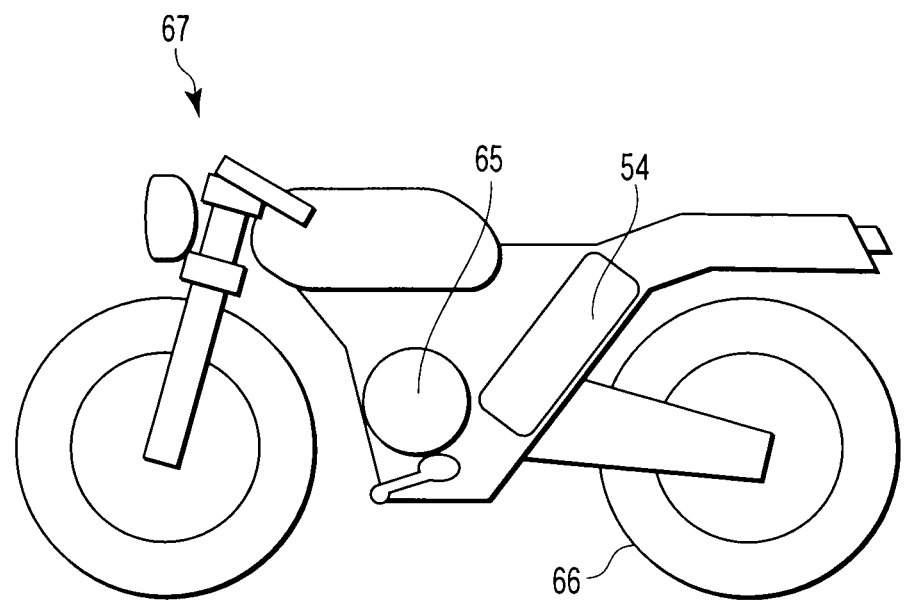
FIG. 14 is a typical view showing an electric motor bicycle according to the fourth embodiment.

FIG. 14 exemplifies the construction of an electric motor bicycle 67. The electric motor bicycle 67 is driven by the energy stored in the battery pack 54 that is charged by the supply of the electric power from the outside. Since all the driving force required for the driving the motor bicycle 67 is generated from the electric motor 65, it is necessary to use the electric motor 65 of a high output. Also, since it is necessary for the battery pack to store all the energy required for one driving by one charging, it is necessary to use a battery pack having a relatively large capacity. It is desirable for the rated capacity of the battery pack to fall within a range of 10 to 50 Ah, more desirably 15 to 30 Ah.

Fifth Embodiment

FIGS. 15 and 16 show an example of a rechargeable vacuum cleaner according to a fifth embodiment. The rechargeable vacuum cleaner comprises an operating panel 75 which selects operation modes, an electrically driven blower 74 comprising a fun motor for generating suction power for dust collection, and a control circuit 73. A battery pack 72 according to the third embodiment as a power source for driving these units are housed in a casing 70. When the battery pack is housed in such a portable device, the battery pack is desirably fixed with interposition of a buffer material in order to prevent the battery pack from being affected by vibration. Known technologies may be applied for maintaining the battery pack at an appropriate temperature. While a battery charger 71 that also serves as a setting table functions as the battery charger of the battery pack according to the third embodiment, a part or all of the function of the battery charger may be housed in the casing 70.

While the rechargeable vacuum cleaner consumes a large electric power, the rated capacity of the battery pack is desirably in the range of 2 to 10 Ah, more preferably 2 to 4 Ah, in terms of portability and operation time. The nominal voltage of the battery pack is desirably in the range of 40 to 80 V.

Generally, a large current of about 3 C to 5 C flows across a battery pack for a rechargeable vacuum cleaner, which is used in all charge states from a fully charged state to a completely discharged state. Because the battery pack according to the third embodiment is superior in cycle performance under a large current as mentioned above, the rechargeable vacuum cleaner according to a fifth embodiment has a strong resistance to repeated charge and discharge.

Examples will be explained below. However, the present invention is not limited to the examples described below and any modification or variation is possible as long as it is within the concepts of the present invention.

EXAMPLE 1

A mixed solution of 20 g of ethanol and 1 g of water was added dropwise to a sol-gel reaction solution prepared by dissolving 25 g of titanium tetraisopropoxide, 50 g of ethanol, 0.12 g of lithium chloride, 0.55 g of tetraethoxysilane and 0.70 g of chromium chloride ($CrCl_3.6H_2O$), and the mixture was allowed to stand at an ambient temperature overnight to obtain a gel. The gel was dried at 100° C. for 12 hours and baked at 600° C. for 6 hours in air to obtain a powder of a negative electrode active material.

EXAMPLE 2

A powder of a negative electrode active material of Example 2 was obtained by carrying out synthesis using the same method as in Example 1 except that 25 g of titanium tetraisopropoxide, 50 g of ethanol, 0.12 g of lithium chloride, 0.55 g of tetraethoxysilane and 0.33 g of iron chloride ($FeCl_2$) were used as the raw materials.

EXAMPLE 3

A powder of a negative electrode active material of Example 3 was obtained by carrying out synthesis using the same method as in Example 1 except that 25 g of titanium tetraisopropoxide, 50 g of ethanol, 0.12 g of lithium chloride, 0.55 g of tetraethoxysilane and 0.63 g of nickel chloride ($NiCl_2.6H_2O$) were used as the raw materials.

EXAMPLE 4

A powder of a negative electrode active material of Example 4 was obtained by carrying out synthesis using the same method as in Example 1 except that 25 g of titanium tetraisopropoxide, 50 g of ethanol, 0.12 g of lithium chloride, 0.55 g of tetraethoxysilane and 0.52 g of manganese chloride ($MnCl_2.4H_2O$) were used as the raw materials.

EXAMPLE 5

A powder of a negative electrode active material of Example 5 was obtained by carrying out synthesis using the same method as in Example 1 except that 25 g of titanium tetraisopropoxide, 50 g of ethanol, 0.12 g of lithium chloride, 0.55 g of tetraethoxysilane and 0.40 g of tin chloride ($SnCl_2.2H_2O$) were used as the raw materials.

EXAMPLE 6

A powder of a negative electrode active material of Example 6 was obtained by carrying out synthesis using the same method as in Example 1 except that 25 g of titanium tetraisopropoxide, 50 g of ethanol, 0.12 g of lithium chloride, 0.86 g of zirconium tetraisopropoxide and 0.70 g of chromium chloride ($CrCl_3.6H_2O$) were used as the raw materials and the baking temperature was changed to 400° C.

EXAMPLE 7

A powder of a negative electrode active material of Example 7 was obtained by carrying out synthesis using the same method as in Example 1 except that 25 g of titanium tetraisopropoxide, 50 g of ethanol, 0.12 g of lithium chloride, 0.86 g of zirconium tetraisopropoxide and 0.33 g of iron chloride ($FeCl_2$) were used as the raw materials and the baking temperature was changed to 400° C.

EXAMPLE 8

A powder of a negative electrode active material of Example 8 was obtained by carrying out synthesis using the same method as in Example 1 except that 25 g of titanium tetraisopropoxide, 50 g of ethanol, 0.12 g of lithium chloride, 0.86 g of zirconium tetraisopropoxide and 0.63 g of nickel chloride ($NiCl_2.6H_2O$) were used as the raw materials and the baking temperature was changed to 400° C.

EXAMPLE 9

A powder of a negative electrode active material of Example 9 was obtained by carrying out synthesis using the same method as in Example 1 except that 25 g of titanium tetraisopropoxide, 50 g of ethanol, 0.12 g of lithium chloride, 0.86 g of zirconium tetraisopropoxide and 0.52 g of manganese chloride ($MnCl_2.4H_2O$) were used as the raw materials and the baking temperature was changed to 400° C.

EXAMPLE 10

A powder of a negative electrode active material of Example 10 was obtained by carrying out synthesis using the same method as in Example 1 except that 25 g of titanium tetraisopropoxide, 50 g of ethanol, 0.19 g of lithium chloride, 0.54 g of aluminum isopropoxide and 0.44 g of iron chloride (FeCl$_2$) were used as the raw materials and the baking temperature was changed to 400° C.

EXAMPLE 11

A powder of a negative electrode active material of Example 11 was obtained by carrying out synthesis using the same method as in Example 1 except that 25 g of titanium tetraisopropoxide, 50 g of ethanol, 0.19 g of lithium chloride, 0.54 g of aluminum isopropoxide and 1.1 g of nickel chloride (NiCl$_2$.6H$_2$O) were used as the raw materials and the baking temperature was changed to 400° C.

EXAMPLE 12

A powder of a negative electrode active material of Example 12 was obtained by carrying out synthesis using the same method as in Example 1 except that 25 g of titanium tetraisopropoxide, 50 g of ethanol, 0.19 g of lithium chloride, 0.54 g of aluminum isopropoxide and 0.95 g of chromium chloride (CrCl$_3$.6H$_2$O) were used as the raw materials and the baking temperature was changed to 400° C.

EXAMPLE 13

A powder of a negative electrode active material of Example 13 was obtained by carrying out synthesis using the same method as in Example 1 except that 25 g of titanium tetraisopropoxide, 50 g of ethanol, 0.19 g of lithium chloride, 0.54 g of aluminum isopropoxide and 0.70 g of manganese chloride (MnCl$_2$.4H$_2$O) were used as the raw materials and the baking temperature was changed to 400° C.

EXAMPLE 14

A powder of a negative electrode active material of Example 14 was obtained by carrying out synthesis using the same method as in Example 1 except that 25 g of titanium tetraisopropoxide, 50 g of ethanol, 0.12 g of lithium chloride, 0.82 g of germanium tetraisopropoxide and 0.70 g of chromium chloride (CrCl$_3$.6H$_2$O) were used as the raw materials.

EXAMPLE 15

A powder of a negative electrode active material of Example 15 was obtained by carrying out synthesis using the same method as in Example 1 except that 25 g of titanium tetraisopropoxide, 50 g of ethanol, 0.12 g of lithium chloride, 0.82 g of germanium tetraisopropoxide and 0.60 g of tin chloride (SnCl$_2$.2H$_2$O) were used as the raw materials.

EXAMPLE 16

A powder of a negative electrode active material of Example 16 was obtained by carrying out synthesis using the same method as in Example 1 except that 25 g of titanium tetraisopropoxide, 50 g of ethanol, 0.04 g of lithium chloride, 0.092 g of tetraethoxysilane and 0.10 g of nickel chloride (NiCl$_2$.6H$_2$O) were used as the raw materials.

EXAMPLE 17

A powder of a negative electrode active material of Example 17 was obtained by carrying out synthesis using the same method as in Example 1 except that 25 g of titanium tetraisopropoxide, 50 g of ethanol, 0.76 g of lithium chloride, 1.83 g of tetraethoxysilane and 1.74 g of manganese chloride (MnCl$_2$.4H$_2$O) were used as the raw materials.

COMPARATIVE EXAMPLE 1

A mixed solution of 20 g of ethanol and 1 g of water was added dropwise to a sol-gel reaction solution prepared by dissolving 25 g of titanium tetraisopropoxide, 50 g of ethanol and 0.12 g of lithium chloride, and the mixture was allowed to stand at an ambient temperature overnight to obtain a gel. The gel was dried at 100° C. for 12 hours and baked at 400° C. for 6 hours in air to obtain a powder of a negative electrode active material of Comparative Example 1.

COMPARATIVE EXAMPLE 2

A mixed solution of 20 g of ethanol and 1 g of water was added dropwise to a sol-gel reaction solution prepared by dissolving 25 g of titanium tetraisopropoxide, 50 g of ethanol, 0.12 g of lithium chloride, and 1.47 g of tetraethoxysilane, and the mixture was allowed to stand at an ambient temperature overnight to obtain a gel. The gel was dried at 100° C. for 12 hours and baked at 600° C. for 6 hours in air to obtain a powder of a negative electrode active material of Comparative Example 2.

COMPARATIVE EXAMPLE 3

A powder of a negative electrode active material of Comparative Example 3 was obtained by carrying out synthesis in the same method as in Comparative Example 2 except that 25 g of titanium tetraisopropoxide, 50 g of ethanol, 0.12 g of lithium chloride and 2.02 g of zirconium tetraisopropoxide were used as the raw materials and the baking temperature was changed to 400° C.

COMPARATIVE EXAMPLE 4

A mixed solution of 20 g of ethanol and 1 g of water was added dropwise to a sol-gel reaction solution prepared by dissolving 25 g of titanium tetraisopropoxide, 50 g of ethanol and 1.11 g of chromium chloride (CrCl$_3$.6H$_2$O), and the mixture was allowed to stand at an ambient temperature overnight to obtain a gel. The gel was dried at 100° C. for 12 hours and baked at 600° C. for 6 hours in air to obtain a powder of a negative electrode active material of Comparative Example 4.

COMPARATIVE EXAMPLE 5

A mixed solution of 20 g of ethanol and 1 g of water was added dropwise to a sol-gel reaction solution prepared by dissolving 25 g of titanium tetraisopropoxide, 50 g of ethanol, 0.55 g of tetraethoxysilane and 0.42 g of chromium chloride (CrCl$_3$.6H$_2$O), and the mixture was allowed to stand at an ambient temperature overnight to obtain a gel. The gel was dried at 100° C. for 12 hours and baked at 600° C. for 6 hours in air to obtain a powder of a negative electrode active material of Comparative Example 5.

COMPARATIVE EXAMPLE 6

A mixed solution of 20 g of ethanol and 1 g of water was added dropwise to a sol-gel reaction solution prepared by dissolving 25 g of titanium tetraisopropoxide, 50 g of ethanol, 0.44 g of iron chloride (FeCl$_2$) and 0.52 g of manganese chloride (MnCl$_2$.4H$_2$O), and the mixture was allowed to stand at an ambient temperature overnight to obtain a gel. The gel was dried at 100° C. for 12 hours and baked at 600° C. for 6 hours in air to obtain a powder of a negative electrode active material of Comparative Example 6.

COMPARATIVE EXAMPLE 7

A mixed solution of 20 g of ethanol and 1 g of water was added dropwise to a sol gel reaction solution prepared by dissolving 25 g of titanium tetraisopropoxide, 50 g of ethanol, 0.70 g of chromium chloride (CrCl$_3$.6H$_2$O) and 0.52 g of manganese chloride (MnCl$_2$.4H$_2$O), and the mixture was allowed to stand at an ambient temperature overnight to obtain a gel. The gel was dried at 100° C. for 12 hours and baked at 600° C. for 6 hours in air to obtain a powder of a negative electrode active material of Comparative Example 7.

COMPARATIVE EXAMPLE 8

Lithium carbonate (Li$_2$CO$_3$), silicon monoxide (SiO), titanium monoxide (TiO) and ferrous oxide (FeO) were mixed such that the molar ratio of these metal elements was 3:10:100:5 and the mixture was sealed in a silicon nitride container under an argon atmosphere and further mixed in a planetary ball mill for 12 hours. The obtained powder was transferred to a MgO crucible, which was then placed in an electric furnace. The atmosphere in the furnace was substituted with argon by vacuum substitution and the mixture was baked at 700° C. for 12 hours in the flow of argon to obtain an active material of Comparative Example 8.

COMPARATIVE EXAMPLE 9

Li$_2$CO$_3$ which was dried at 150° C. under vacuum for 12 hours and TiO$_2$ (rutile) were weighed and mixed such that the ratio of Li:Ti was 4:5 and the mixture was baked at 1000° C. for 60 hours under a flow of dry air in a magnesia crucible to obtain a Li$_4$Ti$_5$O$_{12}$ powder. This powder was subjected to the production of an electrode and a charge/discharge test in the same manner as in Example 1.

COMPARATIVE EXAMPLE 10

The same synthesis as in Comparative Example 9 was carried out except that Al(OH)$_3$ and Fe$_2$O$_3$ were added to the raw material such that the ratios of Al and Fe were 0.03 and 0.03, respectively, based on 1 of Ti to obtain Al.Fe-added Li$_4$TiSO$_{12}$ powder.

COMPARATIVE EXAMPLE 11

The same synthesis as in Comparative Example 9 was carried out except that Al(OH)$_3$ and MnCl$_2$.4H$_2$O were added to the raw material such that the ratios of Al and Mn were 0.015 and 0.015, respectively, based on 1 of Ti to obtain Al.Mn-added Li$_4$Ti$_5$O$_{12}$ powder.

COMPARATIVE EXAMPLE 12

The same synthesis as in Comparative Example 9 was carried out except that Al(OH)$_3$ and NiCl$_2$.6H$_2$O were added to the raw material such that the ratios of Al and Ni were 0.015 and 0.015, respectively, based on 1 of Ti to obtain Al.Ni-added Li$_4$Ti$_5$O$_{12}$ powder.

Each sample obtained in Examples and Comparative Examples was subjected to the following composition analysis, X-ray diffraction, measurement of primary particle diameter and charge-discharge test.

(Composition Analysis)

The obtained sample was subjected to ICP emission analysis to investigate the elemental composition.

(Analysis of Ti Oxidation Number)

The obtained sample was subjected to the measurement of X-ray absorption near-edge structure (XANES) spectrum to investigate the oxidation number of Ti. The measurement was made using, as the standard sample, TiO$_2$ (anatase), Ti$_2$O$_3$ and TiO to compare the spectrums with each other, thereby determining the oxidation number of Ti.

(Measurement of Primary Particle Diameter)

First, about 0.1 g of a sample, a surfactant and 1 to 2 mL of distilled water were added in a beaker and sufficiently stirred and then poured into a stirring water vessel to measure the light intensity distribution 64 times at intervals of 2 seconds by using a laser diffraction type distribution measuring device, to analyze the data of the grain distribution in this method for the measurement of the primary particle diameter. As the average primary particle diameter, the cumulative average particle diameter (50% diameter) was used.

(Measurement of X-ray Diffraction)

The obtained powder sample was subjected to measurement of X-ray diffraction to confirm whether a TiO$_2$ anatase phase or a TiO$_2$ rutile phase was contained. The identification of the anatase phase or rutile phase was made by the diffraction peaks of the anatase phase 101, 200, 004 and 211 planes and the rutile phase 110, 101 and 211 planes. The rutile phase or anatase phase whose presence was confirmed in the sample is described in Table 1.

(Charge/Discharge Test)

7% by weight of graphite having an average diameter of 6 μm and 3% by weight of polyvinylidene fluoride were added to the obtained sample and the mixture was kneaded by using N-methylpyrrolidone as a solvent to prepare a slurry. The obtained slurry was applied to a 12-μm-thick copper foil, which was then pressed and dried at 100° C. under vacuum for 12 hours to make a test electrode. Metal lithium was used for a counter electrode and a reference electrode. LiPF$_6$ was dissolved in a concentration of 1 M in a mixed solvent prepared by mixing EC and MEC in a volume ratio (EC:MEC) of 1:2 to prepare an electrolytic solution. A test cell including the test electrode, counter electrode, reference electrode and electrolytic solution was manufactured in an argon atmosphere.

The following explanations are to show the condition of a charge and discharge test. In this case, the test electrode was charged up to a specified potential corresponding to the voltage difference between the reference electrode and the test electrode, that is, a charge potential of 1.0 V in this case at a current density of 1 mA/cm$^2$, to thereby insert lithium ions into the test electrode, followed by charging at a constant voltage for 8 hours. The test electrode was discharged at a current density of 1 mA/cm$^2$ to a specified discharge voltage, 2.5 V in this case, to release lithium ions from the test electrode. In this charge-discharge test, the charge capacity was defined as the quantity of electricity supplied from the start of charging to the end of the charging and the discharge capacity was defined as the quantity of electricity discharged from the start to end of the discharging.

After the discharge capacity was confirmed by the charge/discharge in the above condition, the sample was allowed to discharge in the condition of 0.05 C and 1 C to calculate the rate of 1 C discharge capacity to 0.05 C discharge capacity, which is represented by (1 C discharge capacity/0.05 C discharge capacity), for comparison of the rate performances.

Next, a charge/discharge cycle involving a charge step and a discharge step performed in the following condition was repeated 100 times to measure the retention rate of discharge capacity in the 100th cycle to that in the first cycle.

In the charge step, the test electrode was charged to the same charge potential as that mentioned above at a current density of 1 mA/cm$^2$ and then charged at a constant voltage for a further 8 hours. In the discharge step, on the other hand, the test electrode was discharged to the discharge potential at a current density of 4 mA/cm$^2$.

Tables 1 and 2 show the elemental composition, crystal phase, primary particle diameter and charge/discharge performance of each active material powder obtained in Examples and Comparative Examples.

TABLE 1

|  | Composition of active material | | | | | Oxidation number of Ti | Type of crystal phase | Primary particle diameter | Charge/discharge performance | | |
|---|---|---|---|---|---|---|---|---|---|---|---|
|  | Li (x) | M1 | a | M2 | b | O (z) |  |  |  | Discharge capacity (mAh/g) | Rate performance (%) | Capacity retention rate of charge/discharge cycles (%) |
| Example 1 | 0.03 | Si | 0.03 | Cr | 0.03 | 2.1 | 4 | Anatase | 600 nm | 230 | 77 | 88 |
| Example 2 | 0.03 | Si | 0.03 | Fe | 0.03 | 2.1 | 4 | Anatase, Rutile | 800 nm | 222 | 57 | 91 |
| Example 3 | 0.03 | Si | 0.03 | Ni | 0.03 | 2.1 | 4 | Anatase, Rutile | 800 nm | 219 | 67 | 78 |
| Example 4 | 0.03 | Si | 0.03 | Mn | 0.03 | 2.1 | 4 | Anatase | 700 nm | 228 | 75 | 85 |
| Example 5 | 0.03 | Si | 0.03 | Sn | 0.02 | 2.1 | 4 | Anatase | 600 nm | 218 | 59 | 82 |
| Example 6 | 0.03 | Zr | 0.03 | Cr | 0.03 | 2.1 | 4 | Anatase | 500 nm | 211 | 67 | 90 |
| Example 7 | 0.03 | Zr | 0.03 | Fe | 0.03 | 2.1 | 4 | Anatase | 500 nm | 218 | 65 | 86 |
| Example 8 | 0.03 | Zr | 0.03 | Ni | 0.03 | 2.1 | 4 | Anatase | 400 nm | 215 | 61 | 72 |
| Example 9 | 0.03 | Zr | 0.03 | Mn | 0.03 | 2.1 | 4 | Anatase | 600 nm | 205 | 86 | 78 |
| Example 10 | 0.05 | Al | 0.03 | Fe | 0.04 | 2.2 | 4 | Anatase | 700 nm | 209 | 71 | 84 |
| Example 11 | 0.05 | Al | 0.03 | Ni | 0.04 | 2.2 | 4 | Anatase | 600 nm | 212 | 53 | 87 |
| Example 12 | 0.05 | Al | 0.03 | Cr | 0.04 | 2.2 | 4 | Anatase | 800 nm | 207 | 52 | 88 |
| Example 13 | 0.05 | Al | 0.03 | Mn | 0.04 | 2.2 | 4 | Anatase | 900 nm | 203 | 58 | 74 |
| Example 14 | 0.03 | Ge | 0.03 | Cr | 0.03 | 2.1 | 4 | Anatase, Rutile | 1000 nm | 218 | 65 | 93 |
| Example 15 | 0.03 | Ge | 0.03 | Sn | 0.03 | 2.1 | 4 | Anatase | 900 nm | 217 | 76 | 89 |
| Example 16 | 0.01 | Si | 0.005 | Ni | 0.005 | 2.0 | 4 | Anatase, Rutile | 900 nm | 210 | 51 | 70 |
| Example 17 | 0.2 | Si | 0.1 | Mn | 0.1 | 2.5 | 4 | Anatase | 800 nm | 203 | 52 | 76 |
| Comparative Example 1 | 0.03 | — | 0 | — | 0 | 2.0 | 4 | Anatase | 1100 nm | 200 | 21 | 45 |
| Comparative Example 2 | 0.03 | Si | 0.08 | — | 0 | 2.2 | 4 | Anatase | 700 nm | 197 | 32 | 67 |
| Comparative Example 3 | 0.03 | Zr | 0.07 | — | 0 | 2.2 | 4 | Anatase | 600 nm | 191 | 26 | 58 |
| Comparative Example 4 | 0.03 | — | 0 | Cr | 0.080 | 2.2 | 4 | Anatase, Rutile | 1200 nm | 160 | 39 | 24 |
| Comparative Example 5 | — | Si | 0.03 | Cr | 0.03 | 2.1 | 4 | Anatase, Rutile | 800 nm | 140 | 46 | 56 |
| Comparative Example 6 | 0.03 | — | — | Mn Fe | 0.03 0.03 | 2.1 | 4 | Anatase, Rutile | 1100 nm | 162 | 48 | 42 |
| Comparative Example 7 | 0.03 | — | — | Mn Cr | 0.02 0.05 | 2.2 | 4 | Anatase, Rutile | 1200 nm | 169 | 45 | 63 |
| Comparative Example 8 | 0.03 | Si | 0.1 | Fe | 0.05 | 1.2 | 2 | — | 38 μm | 12 | 42 | 15 |

TABLE 2

|  | Addition element per 1 mol of Ti | | | | | Charge/discharge performance | | |
|---|---|---|---|---|---|---|---|---|
|  | Li (x) | M1 | a | M2 | b | O (z) | Discharge capacity (mAh/g) | Rate performance (%) | Capacity retention rate of charge/discharge cycles (%) |
| Comparative Example 9 | 0.8 | — | — | — | — | 2.4 | 163 | 62 | 88 |
| Comparative Example 10 | 0.8 | Al | 0.03 | Fe | 0.03 | 2.4 | 157 | 64 | 87 |
| Comparative Example 11 | 0.8 | Al | 0.015 | Mn | 0.015 | 2.4 | 160 | 65 | 89 |
| Comparative Example 12 | 0.8 | Al | 0.015 | Ni | 0.015 | 2.4 | 161 | 69 | 90 |

Each active material obtained in Examples 1 to 17 using the metal oxides having the compositions represented by the foregoing formula (1) produced the effect of further improved discharge capacity, rate performance and cycle performance over each active material obtained in Comparative Examples 1 to 8. With regard to the relation between the type of element M1 and its performance, it was confirmed that a better charge/discharge performance was obtained in Examples 1 to 5 using Si as the element M1 when comparing Examples 1 to 15 with each other.

As regards the combinations of the elements M1 and M2, a good balance among three features, that is, discharge capacity, rate performance and cycle performance was obtained in the case of the following combinations: Si and Cr (Example 1), Si and Mn (Example 4), Zr and Fe (Example 7), Zr and Mn (Example 9) and Al and Fe (Example 10).

The active material of Comparative Example 1 using $TiO_2$ to which Li was added was inferior to Examples 1 to 17 in rate performance and cycle performance. The active materials of Comparative Examples 2 to 4 using $TiO_2$ to which one of the elements M1 and M2 and Li were added were inferior to Examples 1 to 17 in discharge capacity, rate performance and cycle performance. The active material of Comparative Example 5 using $TiO_2$ to which the elements M1 and M2 were added but Li was not added was inferior to Examples 1 to 17 in discharge capacity, rate performance and cycle performance. Also, the active material of Comparative Examples 6 and 7 using $TiO_2$ to which Li and two types of the elements M2 were added were inferior to Examples 1 to 17 in discharge capacity, rate performance and cycle performance.

Since the active material of Comparative Example 8, in turn, was synthesized by baking it in an atmosphere containing no oxygen, the oxidation number of Ti was +2. For this reason, Comparative Example 8 was inferior to Examples 1 to 17 in discharge capacity, rate performance and cycle performance.

Also, Table 2 shows the results of Comparative Examples 9 to 12 in which the metal elements M1 and M2 were added to $Li_4Ti_5O_{12}$ differing in crystal phase from $TiO_2$. As compared with the case of $Li_4Ti_5O_{12}$ (Comparative Example 9) in which no metal element was added, $Li_4Ti_5O_{12}$ in which metal elements were added was reduced in discharge capacity, was improved in rate performance by several percent and was almost equal in cycle performance. These results showed that the addition of Li and the elements M1 and M2 was effective particularly in the case of $TiO_2$.

EXAMPLE 18

5% by weight of graphite having an average diameter of 6 μm and 3% by weight of polyvinylidene fluoride were added to a lithium-cobalt oxide powder and were kneaded by using N-methylpyrrolidone as a solvent to prepare a slurry. The obtained slurry was applied to a 20-μm-thick Al foil, which was then pressed to make a positive electrode. The amount of the slurry applied to the Al foil which was a current collector was so adjusted that the initial charge capacities of the positive electrode and negative electrode per unit area were equal to each other.

The obtained positive electrode and the Ti composite oxide electrode manufactured in Example 1 were coiled through a polyethylene separator interposed therebetween, to obtain an electrode group. The obtained electrode group was received in an outer-package member made of a laminate film and the outer-package was sealed by fusion, leaving an electrolyte injection portion. The package was dried under vacuum at 90° C. for 12 hours. 1 M of $LiPF_6$ was dissolved in a mixture solvent of EC and DEC mixed in a ratio by volume of 1:2 to obtain a nonaqueous electrolytic solution (liquid nonaqueous electrolyte). The obtained nonaqueous electrolytic solution was injected from the electrolyte injection portion of the outer-package in an argon atmosphere, and then, the electrolyte injection portion was sealed to manufacture a nonaqueous electrolyte battery.

The manufactured battery was charged under a constant current (100 mA) and constant voltage (3 V) condition, to find that the capacity of the battery was 530 mAh in the case where the charging was terminated when the current was dropped to 10 mA or less. Further, the battery was discharged under a constant current of 100 mA, to find that the discharge capacity of the battery was 480 mAh in the case where the discharging was terminated when the voltage was dropped to 1.5 V.

This battery was charged under a constant current (0.5 A) and constant voltage (3 V) condition for 3 hours and then discharged under a constant current (0.5 A, termination voltage: 1.5 V) and this charge/discharge cycle was repeated 50 times. Then, the battery obtained after the discharge operation was finished was decomposed in an argon atmosphere. The negative electrode was taken out and a part thereof was used as a test electrode, and metal lithium was used for a counter electrode and a reference electrode. $LiPF_6$ was dissolved in a concentration of 1 M in a mixed solvent prepared by mixing EC and MEC in a volume ratio (EC:MEC) of 1:2 to prepare an electrolytic solution. A test cell including the test electrode, counter electrode, reference electrode and electrolytic solution was manufactured in an argon atmosphere. The negative electrode of the test cell was discharged at a current density of 0.1 mA/cm$^2$ to 2.5 V and allowed to stand for 6 hours, to find that the potential of the test electrode (negative electrode) was 2.25 V with respect to Li of the reference electrode.

This negative electrode was taken out and its composition was analyzed, to find that the ratio of each element was as follows when the content of Ti=1: Li=0.06, Si=0.03, Cr=0.03 and O=2.2, which fulfilled the foregoing formula (1).

It was confirmed from the result of the above Example 18 that in nonaqueous electrolyte batteries using, as the negative electrode active material, metal oxides represented by the formula (1), the composition represented by the formula (1) was maintained not only after the battery was fabricated but also after the battery was charged or discharged when the potential of the negative electrode was in the range of 2.1 to 3.2 V (vs Li/Li$^+$).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A negative electrode active material containing a metal oxide represented by the following formula (1):

$$Li_xM1_aM2_bTiO_z \qquad (1)$$

where M1 represents at least one element selected from the group consisting of Zr, Ge, Si and Al, M2 represents at least one element selected from the group consisting of Cr, Mn, Fe, Ni and Sn, Ti has an oxidation number of +4, and x, a, b and z satisfy the following requirements: 0.01≦x≦0.2, 0.005≦a≦0.1, 0.005≦b≦0.1 and 2≦z≦2.5.

2. The negative electrode active material according to claim 1, wherein the metal oxide contains at least one of an anatase crystal phase and a rutile crystal phase.

3. The negative electrode active material according to claim 1, wherein the element M1 is Si and the element M2 is Mn, the element M1 is Si and the element M2 is Cr, the element M1 is Zr and the element M2 is Fe, the element M1 is Zr and the element M2 is Mn, or the element M1 is Al and the element M2 is Fe.

4. The negative electrode active material according to claim 1, wherein the metal oxide has a primary particle diameter of 10 nm or more and 10 μm or less.

5. A nonaqueous electrolyte battery comprising:
a positive electrode;
a negative electrode containing a metal oxide represented by the following formula (1); and
a nonaqueous electrolyte, $$Li_xM1_aM2_bTiO_z \quad (1)$$

where M1 represents at least one element selected from the group consisting of Zr, Ge, Si and Al, M2 represents at least one element selected from the group consisting of Cr, Mn, Fe, Ni and Sn, Ti has an oxidation number of +4, and x, a, b and z satisfy the following requirements: $0.01 \times x \leq 0.2$, $0.005 \leq a \leq 0.1$, $0.005 \leq b \leq 0.1$ and $2 \leq z \leq 2.5$.

6. The battery according to claim 5, wherein the metal oxide is represented by the formula (1) when at least a potential of the negative electrode is from 2.1 to 3.2 V (vs. Li/Li$^+$).

7. The battery according to claim 5, wherein the element M1 is Si and the element M2 is Mn, the element M1 is Si and the element M2 is Cr, the element M1 is Zr and the element M2 is Fe, the element M1 is Zr and the element M2 is Mn, or the element M1 is Al and the element M2 is Fe.

8. The battery according to claim 5, wherein the metal oxide contains at least one of an anatase crystal phase and a rutile crystal phase.

9. The battery according to claim 5, wherein the metal oxide has a primary particle diameter of 10 nm or more and 10 μm or less.

10. A battery pack comprising a nonaqueous electrolyte battery, the nonaqueous electrolyte battery comprising:
a positive electrode;
a negative electrode containing a metal oxide represented by the following formula (1); and
a nonaqueous electrolyte, $$Li_xM1_aM2_bTiO_z \quad (1)$$

where M1 represents at least one element selected from the group consisting of Zr, Ge, Si and Al, M2 represents at least one element selected from the group consisting of Cr, Mn, Fe, Ni and Sn, Ti has an oxidation number of +4, and x, a, b and z satisfy the following requirements: $0.01 \leq x \leq 0.2$, $0.005 \leq a \leq 0.1$, $0.005 \leq b \leq 0.1$ and $2 \leq z \leq 2.5$.

11. The battery pack according to claim 10, wherein the metal oxide is represented by the formula (1) when at least a potential of the negative electrode is from 2.1 to 3.2 V (vs. Li/Li$^+$).

12. The battery pack according to claim 10, wherein the element M1 is Si and the element M2 is Mn, the element M1 is Si and the element M2 is Cr, the element M1 is Zr and the element M2 is Fe, the element M1 is Zr and the element M2 is Mn, or the element M1 is Al and the element M2 is Fe.

13. The battery pack according to claim 10, wherein the metal oxide contains at least one of an anatase crystal phase and a rutile crystal phase.

14. The battery pack according to claim 10, wherein the metal oxide has a primary particle diameter of 10 nm or more and 10 μm or less.

15. A vehicle comprising the battery pack according to claim 10.

16. The negative electrode active material according to claim 1, wherein a and b satisfy the following relationships: $0.01 \leq a \leq 0.08$ and $0.01 \leq b \leq 0.08$.

* * * * *